(12) United States Patent
Takeda et al.

(10) Patent No.: US 11,108,504 B2
(45) Date of Patent: Aug. 31, 2021

(54) TERMINAL, RADIO BASE STATION, AND RADIO COMMUNICATION METHOD FOR COMMUNICATING

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 15/773,287

(22) PCT Filed: Nov. 4, 2016

(86) PCT No.: PCT/JP2016/082860
§ 371 (c)(1),
(2) Date: May 3, 2018

(87) PCT Pub. No.: WO2017/078159
PCT Pub. Date: May 11, 2017

(65) Prior Publication Data
US 2018/0323907 A1    Nov. 8, 2018

(30) Foreign Application Priority Data

Nov. 5, 2015   (JP) .............................. JP2015-217914

(51) Int. Cl.
*H04L 1/18* (2006.01)
*H04W 72/04* (2009.01)
*H04W 28/06* (2009.01)
*H04W 28/04* (2009.01)
*H04L 5/00* (2006.01)
(Continued)

(52) U.S. Cl.
CPC .......... *H04L 1/1812* (2013.01); *H04L 1/1861* (2013.01); *H04L 1/1864* (2013.01);
(Continued)

(58) Field of Classification Search
CPC ... H04L 1/1812; H04L 1/1864; H04L 1/1887; H04L 5/0094; H04L 5/001; H04L 5/1469;
(Continued)

(56) References Cited

U.S. PATENT DOCUMENTS

2015/0237619 A1* 8/2015 Yang ..................... H04L 5/0094
                                                                 370/280
2016/0295561 A1* 10/2016 Papasakellariou .... H04L 5/0094
(Continued)

OTHER PUBLICATIONS

R1-155092, Detailed Solution for Dynamic HARQ-ACK Codebook determination, Huawei etal , 3GPP, Oct. 2015 (Year: 2015).*
(Continued)

*Primary Examiner* — Habte Mered
(74) *Attorney, Agent, or Firm* — Osha Bergman Watanabe & Burton LLP

(57) ABSTRACT

A user terminal includes: a transmitter that transmits delivery acknowledgement signals (HARQ-ACKs); a receiver that receives downlink control information including: in one or more predetermined subframes of the downlink control information, first information that indicates a total number of cells to be subjected to downlink (DL) transmission scheduling, and second information that indicates a cumulative number of cells; and a processor that performs control so that the HARQ-ACKs are transmitted in predetermined uplink (UL) subframes based on the first information and the second information. The HARQ-ACKs are transmitted in response to DL signals transmitted from a plurality of cells. The plurality of cells include cells that use Time Division Duplex (TDD). A value of the first information is the same in each of the one or more predetermined subframes, and the processor updates the first information on a per subframe basis.

10 Claims, 17 Drawing Sheets

| Value of total DAI | HARQ-ACK codebook size |
|---|---|
| 00 | 32 bits |
| 01 | 64 bits |
| 10 | 96 bits |
| 11 | 128 bits |

(51) Int. Cl.
*H04L 5/14* (2006.01)
*H04W 72/12* (2009.01)

(52) U.S. Cl.
CPC ............ *H04L 5/001* (2013.01); *H04L 5/0055* (2013.01); *H04L 5/0094* (2013.01); *H04L 5/1469* (2013.01); *H04W 28/04* (2013.01); *H04W 28/06* (2013.01); *H04W 72/04* (2013.01); *H04W 72/12* (2013.01); *H04L 1/1887* (2013.01)

(58) Field of Classification Search
CPC ........ H04L 5/0055; H04L 5/14; H04W 28/04; H04W 28/06; H04W 72/04; H04W 72/12
See application file for complete search history.

(56) References Cited

U.S. PATENT DOCUMENTS

| | | | |
|---|---|---|---|
| 2018/0159665 A1* | 6/2018 | Yang | H04W 72/042 |
| 2018/0212717 A1* | 7/2018 | Yang | H04L 1/1812 |
| 2020/0112417 A1* | 4/2020 | Park | H04L 1/1671 |

OTHER PUBLICATIONS

R1-153771, Harq-Ack Codebook determination for carrier aggregation enhancement, Huawei etal, 3GPP, Aug. 2015 (Year: 2015).*
R1-155375, HARQ-ACK payload adaptation for Rel -13 CA, LG Electronics, 3GPP, Oct. 2015 (Year: 2015).*
Extended European Search Report issued in corresponding European Patent Application No. 16862218.1, dated Aug. 17, 2018 (12 pages).
LG Electronics, "HARQ-ACK payload adaptation for Rel-13 CA", 3GPP TSG RAN WG1 Meeting #82bis, R1-155376, Malmö, Sweden, Oct. 5-9, 2015 (8 pages).
Samsung, "HARQ-ACK codebook determination for eCA", 3GPP TSG RAN WG1 Meeting #82bis, R1-155449, Malmö, Sweden, Oct. 5-9, 2015 (12 pages).
Huawei, et al., "Detailed solution for dynamic HARQ-ACK Codebook determination", 3GPP TSG RAN WG1 Meeting #82bis, R1-155092, Malmoö, Sweden, Oct. 5-9, 2015 (6 pages).
International Search Report issued in PCT/JP2016/082860 dated Jan. 17, 2017 (2 pages).
Written Opinion of the International Searching Authority issued in PCT/JP2016/082860 dated Jan. 17, 2017 (4 pages).
3GPP TS 36.300 V1.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2007 (82 pages).
Office Action issued in the counterpart European Patent Application No. 16862218.1, dated Dec. 17, 2020 (11 pages).

* cited by examiner

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | – | – | – | – | – | – | – | – |
| 1 | – | – | 7, 6 | 4 | – | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – | counter DAI, total DAI

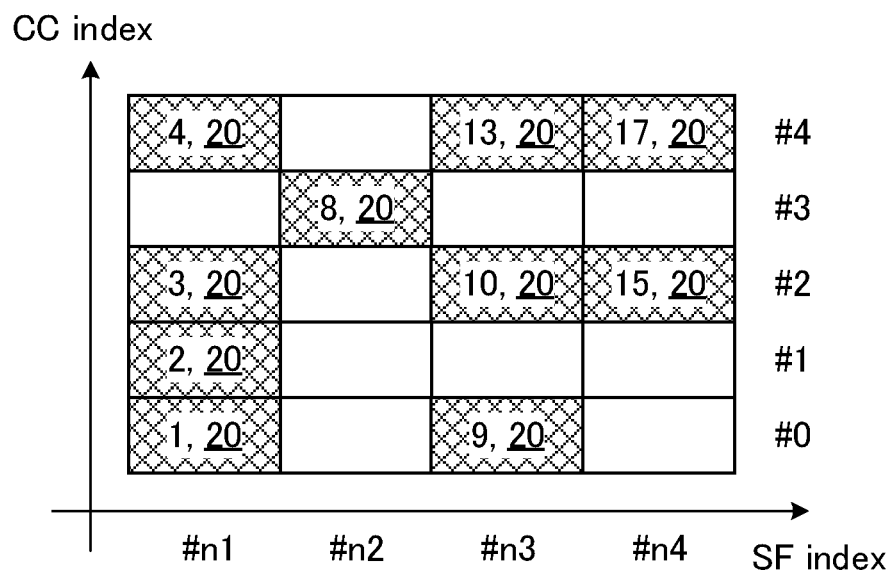
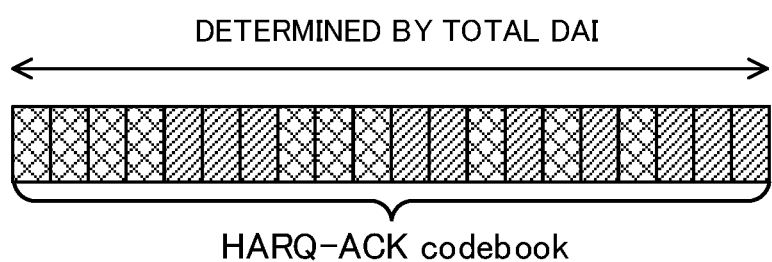
FIG. 7

| DAI value | 00 | 01 | 10 | 11 | 00 | 01 | 10 | 11 | 00 | 01 | 10 | 11 |
|---|---|---|---|---|---|---|---|---|---|---|---|---|
| Value | 0 | 1 | 2 | 3 | 4 | 5 | 6 | 7 | 8 | 9 | 10 | 11 |

FIG. 10A

| Value of total DAI | HARQ-ACK codebook size |
|---|---|
| 00 | 32 bits |
| 01 | 64 bits |
| 10 | 96 bits |
| 11 | 128 bits |

FIG. 10B

| Value of total DAI | HARQ-ACK codebook size |
|---|---|
| 00 | 22 bits |
| 01 | 32 bits |
| 10 | 64 bits |
| 11 | 128 bits |

| Value of total DAI | HARQ-ACK codebook size | | | |
|---|---|---|---|---|
| | 1-PRB | 2-PRB | 3-PRB | 4-PRB |
| 00 | 32 bits | 64 bits | 96 bits | 128 bits |
| 01 | 64 bits | 96 bits | 128 bits | 256 bits |
| 10 | 96 bits | 128 bits | 256 bits | 384 bits |
| 11 | 128 bits | 256 bits | 384 bits | 512 bits |

FIG. 11

TERMINAL, RADIO BASE STATION, AND RADIO COMMUNICATION METHOD FOR COMMUNICATING

CROSS-REFERENCE TO RELATED APPLICATIONS

The present application is a national stage application of PCT Application No. PCT/JP2016/082860, filed on Nov. 4, 2016, which claims priority to Japanese Patent Application No. 2015-217914, filed on Nov. 5, 2015. The contents of the priority applications are incorporated by reference in their entirety.

TECHNICAL FIELD

The present invention relates to a user terminal, a radio base station and a radio communication method in next-generation mobile communication systems.

BACKGROUND

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as LTE Rel. 8 or 9), and successor systems of LTE (also referred to as, for example, "Future Radio Access (FRA)", "$5^{th}$ generation mobile communication system (5G)", "LTE Rel. 13" and so on) are under study. Carriers that constitute the fundamental units in carrier aggregation are referred to as "component carriers (CC)", and are equivalent to the system band of LTE Rel. 8.

When CA is used, in a user terminal (UE: User Equipment), a primary cell (PCell: Primary Cell), which is a cell with high reliability to ensure connectivity, and a secondary cell (SCell: Secondary Cell) which is an adjunct cell, are configured.

The UE can first connect to the PCell and add the SCell if necessary. PCell is a single cell (standalone cell) that supports Radio Link Monitoring (RLM), Semi-Persistent Scheduling (SRS), and the like. SCell is a cell that is configured in UE in addition to PCell.

SCell is added and deleted by Radio Resource Control (RRC) signaling. SCell is in a deactivated state immediately after being added to the user terminal, and can only perform communication (i.e., scheduling) after being activated.

Also, the specifications of LTE Rel. 8 to 12 have been drafted assuming exclusive operations in frequency bands that are licensed to operators (i.e., licensed bands). As licensed bands, for example, the 800 MHz, 2 GHz and/or 1.7 GHz bands are used. Meanwhile, in LTE of Rel. 13 and later versions, operation in frequency bands where license is not required (i.e., unlicensed bands) is also a target of study. For unlicensed bands, for example, the 2.4 GHz and/or the 5 GHz band are used as in Wi-Fi (registered trademark).

Although carrier aggregation (LAA: license-assisted access) between licensed bands and unlicensed bands is placed under study in Rel. 13 LTE, there is a possibility that, in the future, dual connectivity (DC) and unlicensed-band stand-alone will becomes targets of study as well.

In LTE Rel. 8 to 12, Hybrid Automatic Repeat request (HARQ) is used for retransmission control. In HARQ, the user terminal (or the radio base station) feeds back the delivery acknowledgment signal (also referred to as HARQ-ACK, ACK/NACK, A/N, etc.) for the data in accordance with the data reception result at a predetermined timing. The radio base station (or user terminal) controls data retransmission based on the feedback HARQ-ACK.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY

According to one or more embodiments disclosed herein, it is possible to feed back HARQ-ACKs adequately even when a plurality of component carriers are configured in a radio communication system.

One or more embodiments disclosed herein provide a user terminal, a radio base station and a radio communication method that enable adequate feedback of HARQ-ACKs even when a plurality of component carriers are configured in a radio communication system.

In accordance with one embodiment, a user terminal includes: a transmitter that transmits delivery acknowledgement signals (HARQ-ACKs); a receiver that receives downlink control information including: in one or more predetermined subframes of the downlink control information, first information that indicates a total number of cells to be subjected to downlink (DL) transmission scheduling, and second information that indicates a cumulative number of cells; and a processor that performs control so that the HARQ-ACKs are transmitted in predetermined uplink (UL) subframes based on the first information and the second information. The HARQ-ACKs are transmitted in response to DL signals transmitted from a plurality of cells. The plurality of cells include cells that use Time Division Duplex (TDD). A value of the first information is the same in each of the one or more predetermined subframes, and the processor updates the first information on a per subframe basis.

In one aspect, the processor further determines a codebook size of the HARQ-ACKs based on the first information in a last subframe among the one or more predetermined subframes.

In one aspect, for cells that are subjected to DL transmission scheduling, the second information is numbered based on an order of cell indices and an order of subframes subject to DL transmission.

In one aspect, the the processor further selects resources for allocating the HARQ-ACKs based on a Transmission Protocol Control (TPC) field included in a last subframe among the one or more predetermined subframes.

In one aspect, the processor further determines HARQ-ACKs for each bit position in a codebook based on the second information, and the size of the codebook is determined based on the first information.

In one aspect, the processor determines that a HARQ-ACK value in the codebook for a cell where the second information is not detected is a negative acknowledgement (NACK), and the cell is among the total number of cells to be subjected to DL transmission scheduling.

In one aspect, the control section determines a Physical Uplink Control Channel (PUCCH) format based on the first information.

In one aspect, the first information is configured in a bit field that defines a total downlink assignment indication (DAI), and the second information is configured in a bit field that defines a counter DAI.

In accordance with one embodiment, a radio base station communicates with a user terminal that can use a plurality of cells that include cells that use Time Division Duplex (TDD), the radio base station includes: a transmitter that transmits downlink control information including: in one or more predetermined subframes of the downlink control information, first information that indicates a total number of cells to be subjected to DL transmission scheduling, and second information that indicates a cumulative number of cells; and a receiver that receives delivery acknowledgement signals (HARQ-ACKs) transmitted from the user terminal based on the first information and the second information. The first information is configured on a per subframe basis, and a value of the first information is the same in each of the one or more predetermined subframes.

In accordance with one embodiment, a radio communication method for a user terminal that communicates with a radio base station includes: transmitting delivery acknowledgement signals (HARQ-ACKs) in response to downlink (DL) signals transmitted from a plurality of cells; receiving downlink control information comprising: in one or more predetermined subframes of the downlink control information, first information that indicates a total number of cells to be subjected to DL transmission scheduling, and second information that indicates a cumulative number of cells; and performing control to transmit the HARQ-ACKs in predetermined uplink (UL) subframes based on the first information and the second information. A value of the first information is the same in each of the one or more predetermined subframes, the first information is updated on a per subframe basis, and the plurality of cells include cells that use Time Division Duplex (TDD).

BRIEF DESCRIPTION OF DRAWINGS

FIG. 7 is a diagram to show another example of the configuration method of counter DAIs and total DAIs;

FIG. 8A to FIG. 8C are diagrams to show example of the configuration method of counter DAIs and total DAIs;

FIG. 10A and FIG. 10B are diagrams to show examples of information to be included in the bit information of the total DAI;

FIG. 11 is a diagram to show another example of information to be included in the bit information of the total DAI;

DETAILED DESCRIPTION

One or more embodiments disclosed herein will now be described for exemplary purposes with reference to the drawings.

In existing LTE systems of Rel. 12 or earlier versions, the bit size of ACKs/NACKs (also referred to as the "codebook size" and the "bit sequence size") that are fed back by a user terminal is semi-statically determined in advance, based on information reported from a radio base station through higher layer signaling (e.g., the number of CCs and so on). Therefore, when applying CA, the user terminal feeds back ACKs/NACKs in a codebook size that is fixedly determined based on the number of CCs and so on.

Therefore, when the number of CCs configured in the user terminal and the number of CCs where DL signals are scheduled in a given subframe are different, the codebook size cannot be changed in the user terminal. This might result in the case where, even when the number of CCs that are actually scheduled is small, the size of ACKs/NACKs to be transmitted is unnecessarily large.

Also, although, in Rel. 12 or earlier versions, the maximum number of CCs that can be configured in CA is 5, the number of configurable CCs is expected to be increased in Rel. 13 and later versions. In this case, if the bit size of ACKs/NACKs is determined in the same way as in existing LTE systems, the number of CCs that are configured and the number of CCs that are scheduled may differ significantly. This may result in increasing the overhead of UL transmission.

Meanwhile, it may be possible to dynamically control the codebook size of HARQ-ACKs to feed back, based on, for example, DL signals received in the user terminal (for example, based on the number of CCs where DL signals are received). However, if the user terminal fails to detect DL signals or makes error detection, this may lead to the situation where the recognition of the codebook size differs between the radio base station and the user terminal. In this case, there is a possibility that the radio base station is unable to properly receive the ACKs/NACKs fed back from the user terminal (for example, the decoding process), and the quality of communication may be lowered.

Figure 1:
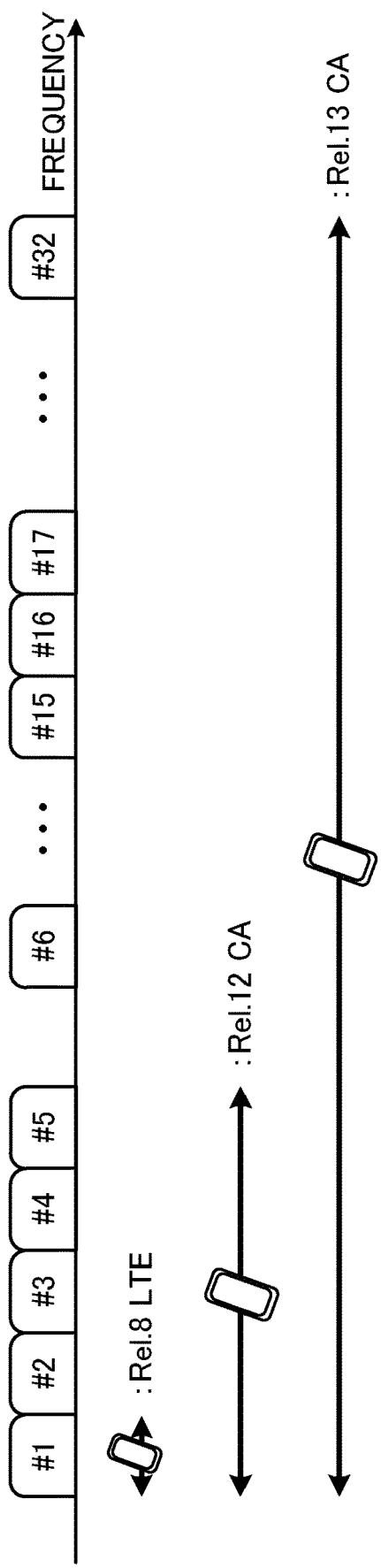
FIG. 1 is a diagram to explain carrier aggregation.

FIG. 1 is a diagram to explain carrier aggregation (CA). As shown in FIG. 1, in CA up to LTE Rel. 12, maximum five component carriers (CCs) (e.g., CC #1 to CC #5) are bundled, where the system band of LTE Rel. 8 constitutes one unit. That is, in CA up to LTE Rel. 12, the number of CCs that can be configured per UE is limited to a maximum of five.

Meanwhile, in CA of LTE Rel. 13, a study is in progress to bundle six or more CCs to further expand the bandwidth. That is, in CA of LTE Rel. 13, expansion of the number of CC (e.g., cells) configurable per UE to six or more (i.e., CA enhancement) is being studied. For example, as shown in FIG. 1, when 32 CCs (e.g., CC #1 to CC #32) are bundled, a bandwidth of maximum 640 MHz can be secured.

More flexible and faster radio communication is expected to be made possible by thus reducing the limit on the number of CCs that can be configured per UE. In addition, such expansion of the number of CCs is effective for widening the band by CA (for example, LAA) between the license band and the unlicensed band. For example, when five licensed band CCs (=100 MHz) and fifteen unlicensed band CCs (=300 MHz) are bundled, a bandwidth of 400 MHz can be secured.

In existing systems (e.g., LTE Rel. 8 to 12), uplink control information (UCI) is fed back from the UE to the device on the network side (for example, a radio base station (eNB: eNode B)) via the uplink control channel (e.g., PUCCH: Physical Uplink Control Channel). At the timing when uplink data transmission is scheduled, the UE may transmit the UCI on the uplink shared channel (e.g., PUSCH: Physical Uplink Shared Channel). Based on the received UCI, the radio base station performs data retransmission control, scheduling control, and the like on the UE.

As described above, in the LTE system, retransmission control is supported in wireless communication between a user terminal using a plurality of CCs (e.g., cells, carriers) and a radio base station. The user terminal feeds back delivery acknowledgment signals (HARQ-ACK: Hybrid Automatic Repeat request Acknowledgment, also referred to as ACK/NACK: Acknowledgment/Negative Acknowledgment, A/N, etc.), to the radio base station, in response to DL transmission transmitted from the radio base station. Here, ACK/NACKs are formed with a bit sequence of a predetermined length, comprised of bits that represent ACKs or NACKs.

Feedback (e.g., UCI on PUCCH) to use an uplink control channel (PUCCH) and feedback (e.g., UCI on PUSCH) to use uplink shared channel (PUSCH) are defined as methods of feeding back HARQ-ACK. For example, when simultaneous PUCCH-PUSCH transmission is not configured and transmission of UL data is commanded at A/N transmission timing, the user terminal transmits A/Ns using the PUSCH. On the other hand, if there is no uplink user data, the user terminal transmits A/Ns using the PUCCH.

Also, in LTE systems, a plurality of PUCCH formats (e.g., PUCCH format, etc.) that the user terminal can use to transmit A/Ns to the radio base station via the uplink control channel are defined. For example, when PUCCH format 1a/1b is configured in the user terminal, the user terminal transmits A/N in a PUCCH resource that corresponds to a Control Channel Element/Enhanced CCE (CCE/ECCE) index of a control channel (e.g., PDCCH/EPDCCH) that schedules the PDSCH, without encoding.

Also, when PUCCH format 3 (PF3) is configured, among four resources configured by higher layer signaling, the user terminal transmits an A/N using one PUCCH resource specified by Ack/nack Resource Indicator (ARI). In this case, the user terminal can read the Transmit Power Control (TPC) field (e.g., TPC command bit) included in the downlink control information of SCell as an ARI.

As a new PUCCH format, introduction of PUCCH format 4 (PF 4) or PUCCH format 5 (PF 5) with larger capacity than PUCCH format 3 is being studied. PUCCH format 4 does not support code multiplexing (CDM), but PUCCH format 4 can be assigned to one or more PRBs (i.e., multiple PRBs). It is also studied to configure PUCCH format 4 so that one demodulation reference signal (DMRS) is provided in each slot. That is, PUCCH format 4 can have a PUSCH-like configuration. Also, PUCCH format 5 supports code multiplexing (CDM) and can be assigned to one PRB, and a study is in progress to configure PUCCH format 5 so that one demodulation reference signal (DMRS) is provided in each slot.

The radio base station can configure the same ARI value between PDCCHs/EPDCCHs scheduling different SCells' PDSCHs, and transmit them to the user terminal. In PUCCH format 3, when Frequency Division Duplex (FDD) is used, a codebook size of maximum 10 bits is configured, and, when Time Division Duplex (TDD) is used, a codebook size of maximum 21 bits is configured, and these are used for A/Ns.

In existing systems (e.g., LTE Rel. 10 to 12), as mentioned earlier, the codebook size of HARQ-ACKs (e.g., ACK/NACK bit sequence) to be transmitted on the PUCCH is determined semi-statically based on information reported by higher layer signaling.

In the case of using FDD, the overall A/N bit size is determined based on the number of CCs configured by RRC signaling and the Transmission Mode (TM), which indicates whether Multiple Input Multiple Output (MIMO) is applicable in each CC. In a certain DL subframe, if a DL assignment is detected in at least one SCell, the user terminal feeds back A/Ns in all the CCs configured in the UL subframe after a predetermined period (for example, 4 ms).

When TDD is used, in addition to the above case using FDD, the overall size of the A/N bit sequence transmitted on the PUCCH is determined based on the number of DL subframes addressed by A/Ns per UL subframe. When the user terminal using TDD detects at least one DL assignment in the bundling window, the user terminal feeds back A/Ns for all the configured CCs using the PUCCH in the UL subframe after a predetermined period (for example, (n+k) ms). Also, UL Downlink Assignment Indicator (DAI) (Index), indicating the total number of subframes in which DL assignment is transmitted, among the subframes included in the bundling window, is reported to the user terminal, in the UL grant.

Bundling window refers to a group of DL subframes, to which A/N feedback is sent in a certain UL subframe—that is, the bundling window refers to a group of DL subframes (including special subframes) corresponding to a UL subframe in which A/N feedback is sent. The bundling window is defined by the UL/DL configuration of TDD (see FIG. 2A). The user terminal that communicate using TDD controls so that A/Ns in response to DL signals transmitted in predetermined subframes are transmitted in predetermined UL subframes based on the bundling window.

For example, when UL/DL configuration 2 is applied, the bundling window corresponding to UL subframe #2 is composed of DL subframes #4, #5, #8, and special subframe

Figures 2A, 2B:
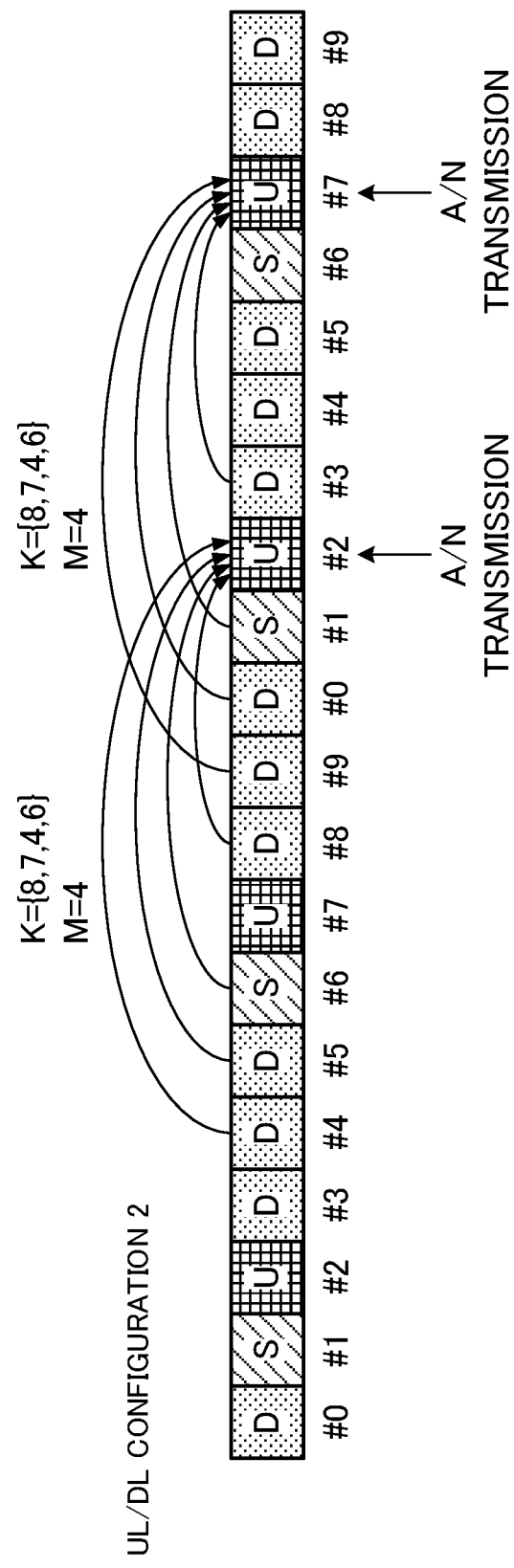
FIG. 2A and FIG. 2B are diagrams for explaining a bundling window defined in TDD.

6 (see FIG. 2B). Also, the bundling window for UL subframe #7 is composed of DL subframes #9, #0, #3 and special subframe #1.

When the user terminal detects at least one downlink control information (e.g., DL assignment) in SF #4 to #6, #8, in UL subframe #2, the user terminal feeds back A/Ns for all the configured CCs in the PUCCH. That is, the user terminal transmits the ACK/NACK bit sequence, based on higher layer signaling, irrespective of the number of CCs to be scheduled and the number of subframes included in the scheduling information.

In this way, when the bit size of ACKs/NACKs to be fed back is determined based on information reported by higher layer signaling, the situation might arise where the ACK/NACK bit size does not match the number of CCs actually scheduled in the user terminal. Consequently, when A/N feedback of existing systems is used, even when the ACK/NACK codebook size to match the CCs that are actually scheduled (e.g., CCs where DL signals are transmitted) is different from the codebook size reported by higher layer signaling, the user terminal still cannot change the codebook size.

On the other hand, in LTE Rel. 13 and later versions, in order to realize more flexible and faster wireless communication, a study is in progress to reduce the limit on the number of CCs that can be configured in a user terminal and to configure 6 or more CCs (e.g., more than five CCs, up to, for example, 32 CCs). When the number of CCs to be configured is expanded, it is possible that the gap between the number of CCs configured and the number of CCs scheduled in each subframe increases. If the number of CCs where DL signals are scheduled is less than the number of CCs to be configured and the codebook size is determined semi-statically as in conventional cases, this leads to the situation where most of the ACKs/NACKs transmitted from the user terminal are NACKs.

Figure 3A:
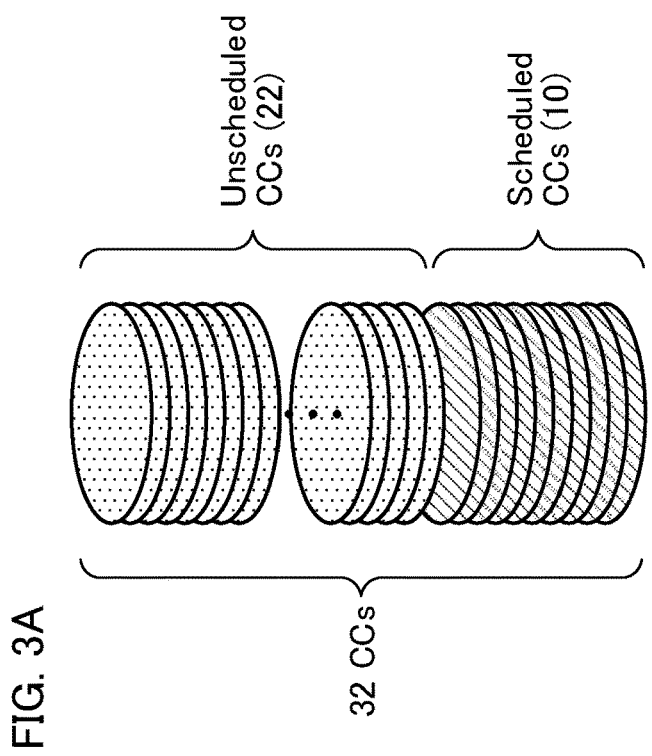
FIG. 3A and FIG. 3B are diagrams to show examples of recognition of scheduling CCs between a user terminal and a radio base station.

For example, FIG. 3A shows a case where 32 CCs are configured in the user terminal and where the number of CCs actually scheduled is 10. In this case, the number of actually scheduled cells (e.g., ten CCs) is smaller than the total number of CCs (e.g., 32 CCs), and more than half of the CCs are returned NACKs.

In general, the smaller the A/N codebook size, the smaller the amount of information that the user terminal transmits. Therefore, if the A/N codebook size can be reduced, the quality of communication (SINR: Signal to Interference plus Noise Power Ratio) required in radio transmission can be kept low. For example, in CA using five CCs at a maximum, the SINR required in ACK/NACK transmission can be kept low by decreasing the A/N codebook size fed back by the user terminal according to the CCs that are scheduled.

By performing transmission power control so as to increase the transmission power according to the codebook size, the transmission power can be controlled to satisfy the required SINR regardless of the codebook size. However, even in this case, by reducing the codebook size of A/Ns fed back from the user terminal according to the number of scheduled CCs, the transmission power required for A/N transmission can be kept low.

Therefore, it is effective to make it possible to dynamically change the codebook size of A/Ns (HARQ-ACKs) that the user terminal feeds back, according to the number of CCs that are scheduled. In the case where the codebook size of A/Ns to be fed back from the user terminal can be changed dynamically, for example, the user terminal may change the number of ACK/NACK bits dynamically depending on the number of scheduled CCs and so on. As a method of changing the number of A/N bits dynamically like this, for example, the user terminal may determine the number of A/N bits based on the number of downlink signals detected (for example, PDSCH-scheduling PDCCHs/EPDCCHs).

Incidentally, in a PUCCH format (for example, format 3) for use for A/Ns to which CA is applied, the A/N bit sequence is subjected to error correction coding (for example, block coding) and transmitted. Therefore, if the recognition of the codebook size does not match between the user terminal that performs encoding and the radio base station that performs decoding, the radio base station cannot correctly decode the ACKs/NACKs fed back from the user terminal.

Figure 3B:
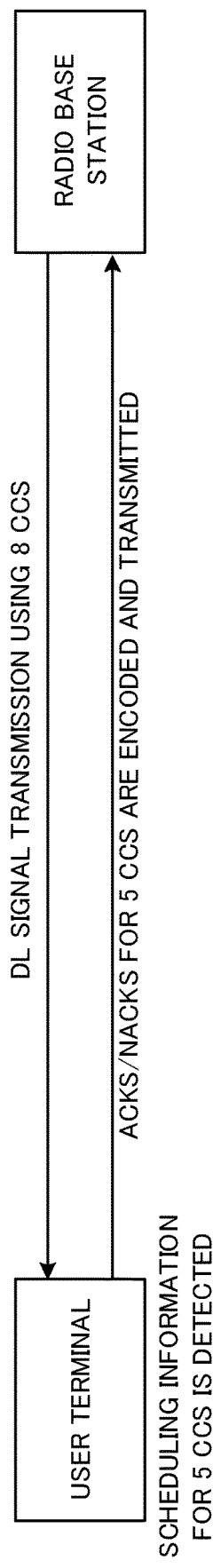

For example, when a detection failure or error detection occurs and the number of CCs which the user terminal recognizes is different from the number of CCs actually scheduled, the situation arises where the recognition of the codebook (e.g., bit sequence) size does not match between the radio base station and the user terminal (see FIG. 3B). FIG. 3B shows a case where, although the radio base station performs scheduling (e.g., DL signal transmission) for the user terminal by using eight CCs, the user terminal detects only the PDCCHs/EPDCCHs (e.g., scheduling information) for five CCs. That is, the user terminal fails to detect the DL signals (for example, PDCCHs/EPDCCHs) of three CCs.

Referring to FIG. 2, if the A/N codebook size is determined based on the DL signals (i.e., the number of CCs) detected by the user terminal, the user terminal transmits an ACK/NACK bit sequence for the five CCs detected, to the radio base station. For this reason, the radio base station cannot perform decoding properly, and the entire ACK/NACK bit sequence is affected, and the quality of feedback using ACKs/NACKs is severely deteriorated.

In this way, when the user terminal fails to detect DL signals transmitted from the radio base station in a predetermined CC, the user terminal judges the number of CCs allocated smaller than the number of CCs in which DL signals are transmitted from the radio base station. Further, when the user terminal makes error detection of DL signals transmitted from the radio base station, the user terminal judges the number of allocated CCs bigger than the number of CCs in which DL signals are transmitted from the radio base station.

Although the method of determining the codebook size of A/Ns to transmit from the user terminal based on the number of PDCCHs/EPDCCHs detected is easy to implement, when detection failures or error detections occur, the recognition of the codebook size does not match between the radio base station and the user terminal. In this case, as described above, the quality of feedback based on A/Ns deteriorates, and the quality of communication may be severely deteriorated.

Therefore, it may be possible to report the CCs scheduled in a certain subframe to the user terminal using a DL assignment index (DAI: Downlink Assignment Indicator (Index)) included in the downlink control information (e.g., DL assignment) of each CC. DAIs are values assigned to every scheduled cell and used to indicate the number of scheduling CCs (e.g., accumulative number of CCs).

For example, in the radio base station, DAIs corresponding to each CC are configured and transmitted in scheduled CCs' downlink control information. The DAIs to be included in the downlink control information of each cell can be configured in ascending order based on CC indices (e.g., cell indices) or the like, for example. In this case, the DAI of the cell with the largest cell index among the scheduled cells is the maximum DAI (e.g., the number of scheduled cells). When the DAI bit field included in the downlink control information is two bits, bits are allocated according to the order of the CC indices (e.g., cell indices) of the scheduled CCs (e.g., cells). In this case, at least CCs with neighboring CC indices are associated with different bit values, among the scheduled CCs.

Assuming the case where DL signals are received from a plurality of cells, if the values of the DAIs (e.g., accumulative numbers, count values, etc.) included in each CC's downlink control information are not continuous, the user terminal can judge that it has made a detection failure in the cell corresponding to the missing DAI. In this way, by using DAIs, it is possible to match the recognition of the ACK/NACK codebook size between the user terminal and the radio base station, and, furthermore, on the radio base station side, apply appropriate retransmission control to CCs which the user terminal fails to detect.

However, the present inventors have found out that, even when DAIs are used, if the user terminal fails to detect the cell in which the DAI included in the downlink control information is the largest among the scheduled CCs, the user terminal is unable to recognize this detection failure. For this reason, it is effective for the radio base station to include information on the number of scheduled CCs in downlink control information and report the downlink control information to the user terminal. That is, the radio base station includes information for use for counting scheduling CCs and information indicating the number of scheduling CCs in the downlink control information of each CC, and reports the downlink control information to the user terminal. In the following description, the information used to count scheduling CCs is referred to as counter DAI, and the information indicating the number of scheduling CCs is referred to as total DAI.

For example, when FDD is applied, counter DAIs and total DAIs are included in the downlink control information of scheduled CCs in the radio base station and transmitted. Counter DAIs indicate the accumulative number of scheduled CCs, and counter DAI values numbered according to the order of CC indices can be included in the downlink control information of each CC. Total DAIs indicate the total number of CCs scheduled in a certain subframe.

Figure 4A:
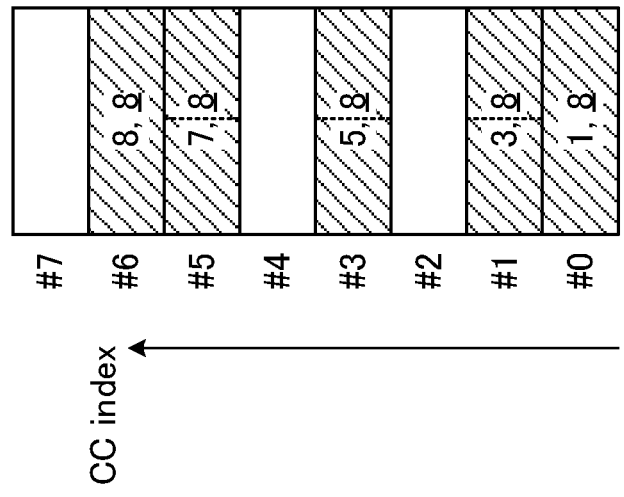
FIG. 4A and FIG. 4B are diagrams to show examples of a configuration method of counter DAIs and total DAIs in FDD.
Figure 4B:
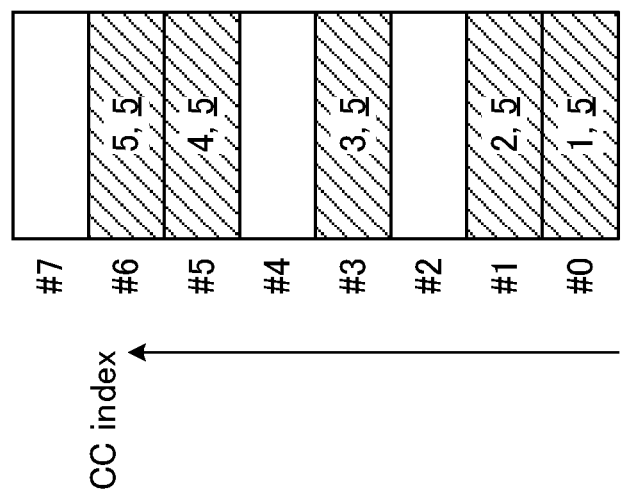

In FIG. 4, eight CCs (e.g., CC #0 to #7) are configured at the user terminal, and examples of counter DAIs and total DAIs to be transmitted when only a part of CCs (e.g., CCs #0, #1, #3, #5 and #6) are scheduled in a certain subframe are shown. The radio base station determines the counter DAIs for CCs #0, #1, #3, #5 and #6 (here, the counter DAI values=1 to 5), and, furthermore, determines the total DAIs (here, the total DAI value=5) (see FIG. 4A). Then, the radio base station includes the counter DAI (=1) and the total DAI=5) in the downlink control information of CC #0. Similarly, the radio base station includes, in the downlink control information of each CC, a counter DAI corresponding to the CC and a total DAI (=5) that is common to each CC.

Note that the counter DAIs and the total DAIs can be configured based on the number of codewords (CW), not the number of CCs. In the case shown in FIG. 4B, the counter DAIs and the total DAIs are configured based on the number of CWs. In this case, among CC #0, #1, #3, #5, and #6 to be scheduled, CC #0 and #6 are subject to one-CW transmission and CCs #1, #3 and #5 are subject two-CW transmission. The radio base station determines the counter DAIs for CCs #0, #1, #3, #5 and #6 (here, counter DAI values=1, 3, 5, 7, 8), and also determines the total DAIs (here, the total DAI value=8). In the following description, it is shown that counter DAIs and total DAIs are configured based on the number of CCs for simplicity, but it is equally possible to configure counter DAIs and total DAI based on the number of CWs, and this will not result in loss of generality. That is, if CWs are configured, CWs can be applied instead.

Thus, the counter DAI and the total DAI are included in the downlink control information of each CC, and the downlink control information is reported to the user terminal thus, even if the user terminal fails to detect the CC (here, CC #6) having the maximum counter DAI, the user terminal can know the failure.

On the other hand, even when TDD is applied, it may be possible to control the HARQ-ACK transmission by reporting counter DAIs and total DAIs to the user terminal. However, in this case, how to configure and use counter DAIs and total DAIs is unclear.

For example, as in the case of FDD, it may be possible to configure counter DAIs and total DAIs for each subframe based on the number of CCs (or the number of CWs) scheduled in each subframe. In the example of FIG. 5A, in the bundling window composed of four subframes (e.g., SF #n1 to #n4), counter DAI and total DAI are configured for each subframe.

In the case shown in FIG. 5A, five CCs (e.g., CC #0 to #4) are configured in the user terminal, four CCs (e.g., CC #0, #1, #2, #4) are scheduled in SF #n1, one CC (e.g., CC #3) is scheduled in SF #n2, three CCs (e.g., CC #0, #2, #4) are scheduled in SF #n3 and two CCs (e.g., CC #2, #4) are scheduled in SF #n4. Note that the SF #n1 to #n4 in the bundling window are determined based on the UL/DL configuration, and, for example, in the bundling window corresponding to UL subframe #2 of the UL/DL configuration 2, SF #n1 to #n4 correspond to SF #4 to #6, and #8, respectively.

In the case shown in FIG. 5A, if the user terminal fails to detect the DL assignments of all scheduled CCs in a certain subframe, the user terminal cannot know the number of HARQ-ACK bits in the subframe. For example, if the user terminal cannot detect the downlink control information transmitted from CC #3 in SF #n2, the user terminal may determine that there is no DL allocation in SF #n2 and perform HARQ-ACK transmission. In this case, the recognition of the codebook size (e.g., ACK/NACK bit size) does not match between the user terminal and the radio base station, and the radio base station may not be able to correctly receive the HARQ-ACK bit sequence (e.g., HARQ-ACK codebook) fed back from the user terminal.

So, the present inventors came up with using counter DAIs and total DAIs in units of bundling windows, not subframe units. To be more specific, the accumulative number of CCs (or CWs) scheduled in a bundling window is reported to the user terminal using counter DAIs, and the number of CCs (or CWs) scheduled in the bundling window is reported using the total DAIs.

Figure 5B:
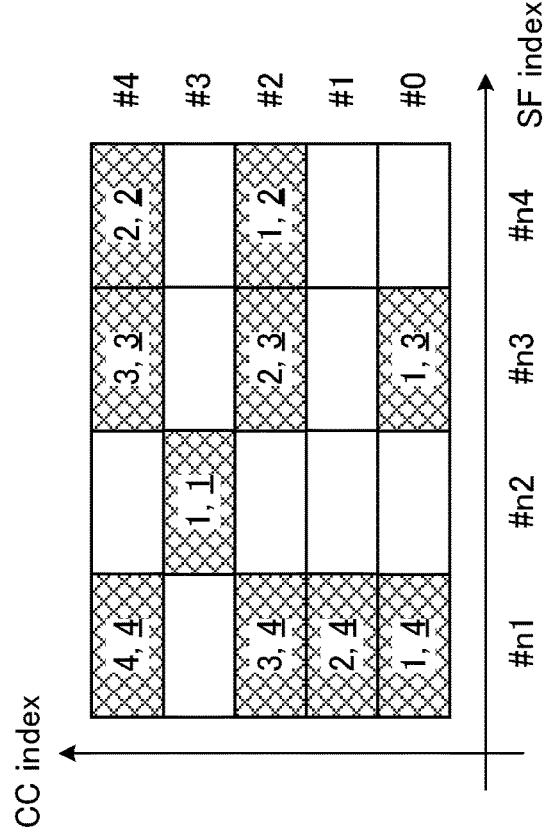
FIG. 5A and FIG. 5B are diagrams to show examples of a configuration method of counter DAIs and total DAIs in the bundling window specified by TDD.
Figure 5A:
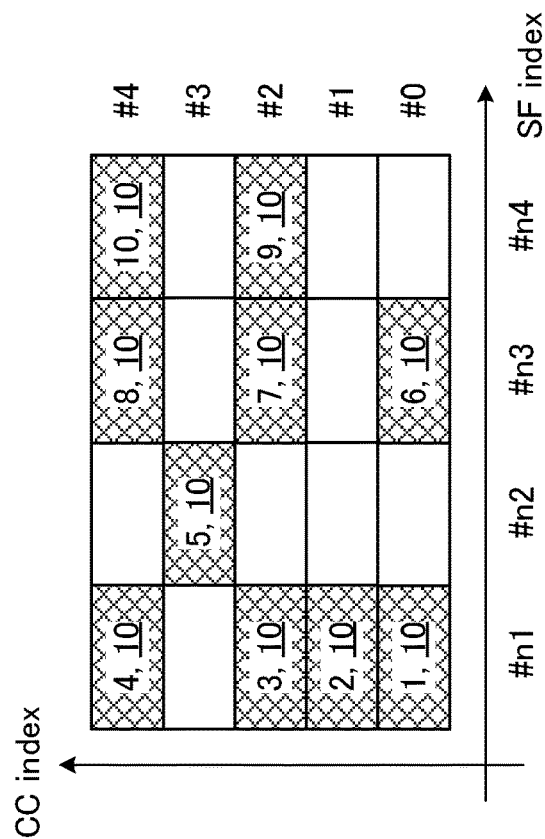

FIG. 5B shows an example of the case where counter DAIs and total DAIs are configured in units of bundling windows. The number of CCs, the number of subframes and the scheduling status are the same as shown in FIG. 5A. In FIG. 5B, different counter DAIs (here, 1 to 10) are configured in the downlink control information of CCs scheduled in SF #n1 to SF #n4, and a common total DAI (here, 10) is configured in the downlink control information of each CC. Thus, even if the user terminal fails to detect the DL assignments of all CCs (for example, CC #3) in a certain subframe (for example, SF #n2), the user terminal can still recognize the detection error and perform HARQ-ACK transmission.

In addition, the present inventors paid attention to the fact that it is difficult for the radio base station to determine in advance the total DAI to include in the downlink control signal of each CC depending on the configuration in the bundling window (e.g., such as the number of DL subframes to be configured) and the communication environment. That is, when the radio base station determines the total DAI (e.g., the number of scheduling CCs) that is common in each subframe, the radio base station needs to schedule each subframe constituting the bundling window in advance (e.g., at the latest, by the time SF #n1 is transmitted). For example, in the case shown in FIG. 5B, in order to include a total DAI in the downlink control information of the CCs scheduled in SF #1, the scheduling of CCs (for example, the number of scheduled CCs) in SF #1 to SF #4 needs to be determined in advance.

When the radio base station can schedule future subframes (for example, all the subframes constituting the bundling window) in advance, the radio base station can report the total DAI determined according to the scheduled CCs to the user terminal. On the other hand, depending on the communication environment and the subframes constituting the bundling window (e.g., UL/DL configuration to be applied), it may be difficult for the radio base station to schedule future subframes in advance.

Therefore, the present inventors came up with the idea of specifying the HARQ-ACK codebook size using the total DAI, instead of specifying the number of CCs (or CWs) actually scheduled by using the total DAI. That is, the user terminal can judge that the value specified by the total DAI is not the number of scheduled CCs (or CWs) but is the codebook size, and can control HARQ-ACK transmission.

As a result, the radio base station can configure a number larger than the number of CCs (or CWs) actually scheduled, as the codebook size, and report this to the user terminal by using downlink control information. As a result, even if the radio base station cannot perform the scheduling of all the subframes constituting the bundling window in advance, it becomes possible to share the HARQ-ACK codebook size between the radio base station and the user terminal.

Now, embodiments disclosed herein will be described below. In the following description, the case where the number of CCs configured in the user terminal is 5 (CC #0 to #4) is shown, but the number of CCs that can be configured in the user terminal is limited to this. Also, when four SFs are configured as a bundling window (for example, a bundling window corresponding to UL subframe 2 of UL/DL configuration 2), one or more embodiments are not limited to this. The number of SFs included in the bundling window is not limited to 4 and can be changed according to the UL/DL configuration.

Also, the number and arrangement of cells to be scheduled, the indices of cells to be scheduled, and the signals to be transmitted are not limited to those in the following examples. Also, the case where first information indicating the codebook size is included in the total DAI and second information indicating the accumulative number (e.g., count value) of CCs scheduled in the subframes constituting the bundling window is included in the counter DAI is explained below, but this is not limiting. The first information and/or the second information may be included in another bit field of the downlink control information.

Furthermore, the following embodiments are explained based on the premise that one-bit ACK/NACKs needs to be fed back to each cell and each subframe subject to DL data (e.g., PDSCH) scheduling, ACKs/NACKs are not limited to one bit. Transmission modes that are configured per CC in LTE include a transmission mode in which only one-CW DL data (e.g., PDSCH) can be scheduled (e.g., TM1, TM2, etc.) and a transmission mode in which two CW DL data (PDSCH) can be scheduled (for example, TM3, TM4, TM9, TM10, etc.). As described above, regardless of the transmission mode of each CC, by setting ACK/NACK as one bit, overhead of HARQ-ACK feedback can be suppressed (e.g., in the case of two CWs, exclusive OR may be used). Alternatively, by configuring ACKs/NACKs in two bits regardless of the transmission mode of each CC (e.g., in case of one CW, the second bit is set to NACK), it is possible to realize fine HARQ control in the case of two CWs. One of these two controls may be configured by higher layer signaling and/or the like. In the following embodiment, even if ACK/NACK of each CC is replaced with two bits, the respective effects are not lost.

In one or more embodiments, the case where the information on the codebook size is reported to the user terminal by using the total DAI will be described.

Figure 6B:
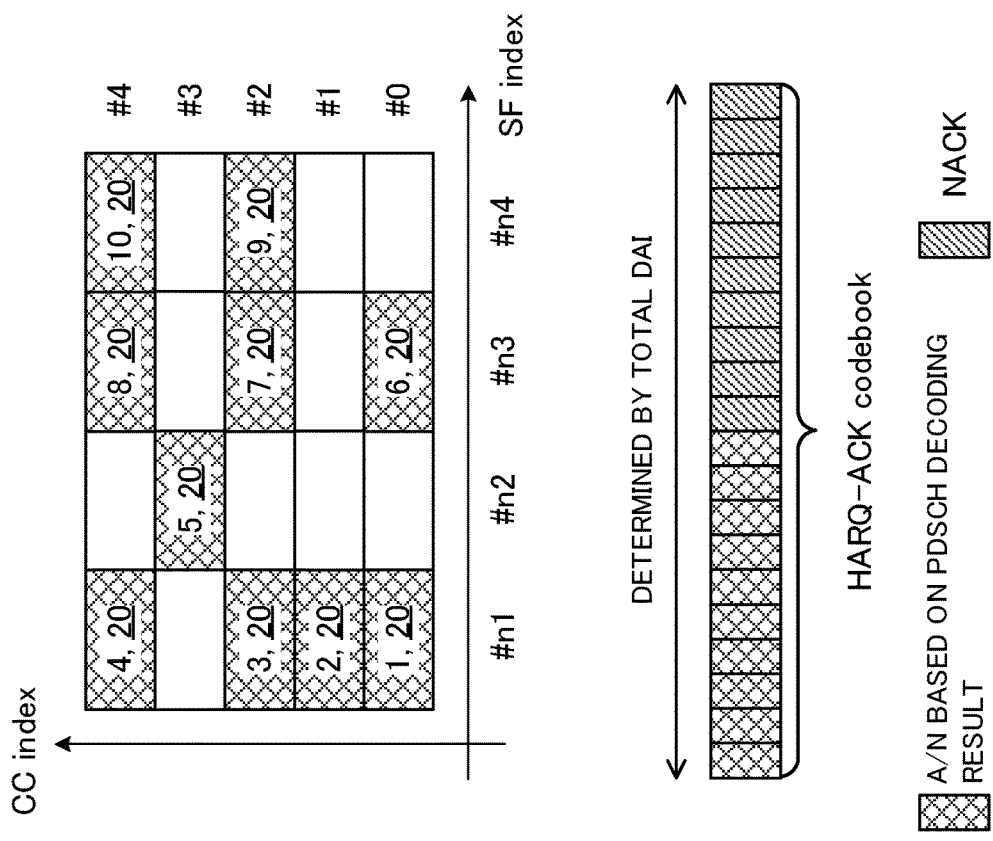
FIG. 6A and FIG. 6B are diagrams to show examples of a configuration method of counter DAIs and total DAIs.
Figure 6A:
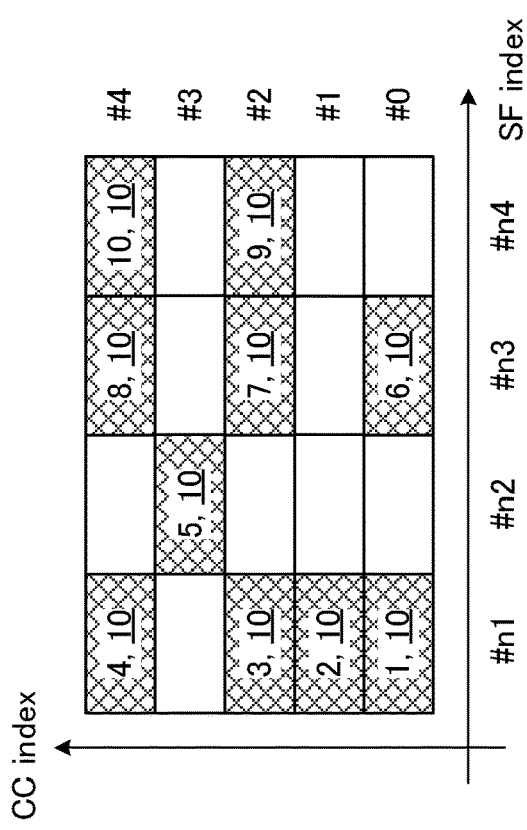

FIG. 6 shows examples of counter DAIs and total DAIs included in each downlink control information of the CCs scheduled in the bundling window. In the case shown in FIG. 6A, a value corresponding to the number of CC (or CW) actually scheduled by the radio base station is included in the downlink control information of the CCs scheduled in each subframe (SF). For example, if the radio base station can schedule all the SFs constituting the bundling window in advance, a value corresponding to the number of scheduled CCs (CWs) is configured as total code DAI as a codebook size and reported to the user terminal.

The user terminal determines the HARQ-ACK codebook size in the bundling window based on the total DAI. Further, the user terminal determines the A/N at each position in the HARQ-ACK codebook in the bundling window based on the counter DAI (e.g., position of the bit sequence). In FIG. 6A, the user terminal determines that the codebook size is 10 bits based on the total DAI.

Further, the user terminal determines the A/N of each bit sequence in the codebook of size 10 bits based on the detection result of the DL signal (for example, PDSCH) of CC scheduled in each SF. Note that the bit sequence of the codebook can be configured to correspond to the counter DAI (for example, the order of the counter DAI values). For example, counter DAIs can be configured and numbered from the youngest number of the CC index (e.g., cell index) in the order of scheduled SFs (see FIG. 6).

In the case shown in FIG. 6B, a value larger than the number of actually scheduled CCs (or CWs) is included in the downlink control information of the CCs scheduled in each SF. For example, if the radio base station cannot pre-schedule all the SFs constituting the bundling window, a prescribed value (e.g., 20 in this case) is configured as a codebook size to total DAI and reported to the user terminal. The predetermined value may be a predetermined value or may be determined in consideration of the scheduling status in the radio base station (for example, the scheduling status up to the middle SF).

In FIG. 6B, the user terminal determines that the codebook size is 20 bits based on the total DAI. Also, the user terminal determines the A/N of each bit sequence in the codebook with a size of 20 bits based on the detection result of the DL signals of the CCs scheduled in each subframe (for example, PDSCH). Note that the bit sequence of the codebook can have a configuration corresponding to the counter DAI (for example, in the order of counter DAI values). For example, counter DAIs can be numbered from the CC index (e.g., cell index) of the youngest number, in the order of scheduled SFs.

In FIG. 6B, the codebook size is configured larger than the number of scheduled CCs (or the number of CWs). In this case, the user terminal can assign ACK or NACK to the first 10 bits of the codebook according to the detection result of DL signals and assign NACK to the remaining 10 bits (for example, when the counter DAI is 1 to 10).

When scheduling and DAI control are performed as shown in FIG. 6B, since the radio base station already knows that the latter ten bits in the codebook fed back from the user terminal are NACK, the radio base station uses this as near-field information to improve the performance of error correction decoding. However, since the known bits are concentrated in the latter ten bits, for example, assuming that trellis decoding is applied to convolution coding, it is possible to further improve the error correction decoding performance improvement effect by arranging the known bits in a more distributed manner within the codebook.

Therefore, for example, as shown in FIG. 7, when the value of the total DAI is configured to a sufficiently large value, instead of configuring continuous values according to the scheduled CC as counter DAI values, the radio base station may allow discontinuous values to be configured as DAI values. In the case shown in FIG. 7, the values of counter DAIs included in DL assignments received by the user terminal increase as: "1, 2, 3, 4, 8, 9, 10, 13, 15 and 17." If the user terminal cannot determine whether the DAI values are discontinuous because the radio base station intentionally has allocated such values or because the user terminal has failed to detect DL assignments, in the 20-bit HARQ-ACK codebook, the user terminal arranges ACKs/NACKs based on the PDSCH decoding result at positions corresponding to the values of the detected counter DAIs. By using this fact, as shown in FIG. 7 for example, by allowing the base station to increment the values of counter DAIs discontinuously within the bundling window, known NACK bits can be distributed in the codebook as described above, so that the effect of improving error correction performance can be improved.

The user terminal can determine the codebook size of HARQ-ACKs (e.g., here, 20 bits) based on the total DAI. Further, the user terminal determines the position of the bit sequence of the codebook corresponding to the counter DAI based on the counter DAI, and also the user terminal determines the A/N based on the decoding result of the PDSCH of the CC including the counter DAI. In the codebook, if the corresponding counter DAI has not been received, the user terminal determines that the bit sequence corresponding to the counter DAI is a NACK.

Also, when multiple PUCCH formats are configured in the user terminal, the user terminal can select a predetermined PUCCH format to be applied to the A/N feedback based on the total DAI (e.g., codebook size).

In this way, by reporting the HARQ-ACK codebook size to the user terminal using the total DAI, it is possible to flexibly configure the HARQ-ACK codebook size according to the scheduling status of the radio base station and so on. For example, when the radio base station can schedule all the SFs constituting the bundling window in advance, a value corresponding to the number of scheduling CCs (e.g., CWs) can be configured as a total DAI (e.g., codebook size). By doing this, can configure the HARQ-ACK codebook size to be smaller.

On the other hand, if the radio base station cannot pre-schedule all the SFs constituting the bundling window, a sufficiently large value can be configured as a total DAI (e.g., codebook size). As a result, it is possible to suppress the scheduling operation for other SFs constituting the bundling window from being limited (i.e., affected) by the total DAI (especially later subframes).

In one or more embodiments, it is permissible to configure different total DAI for each SF in the bundling window.

In FIG. 6, it was shown that the total DAI included in the downlink control information (e.g., DL assignment) is commonly configured within the same bundling window. However, even when the radio base station allocates little traffic to the user terminal in the first SF (e.g., SF #n1) in the bundling window, the radio base station might start scheduling a large volume of data for that user from the SF in the middle in the bundling window. In such a case, if the total DAI initially determined by the radio base station is not sufficient, the scheduling in the second half SF may be restricted. However, if always configure a large total DAI to avoid scheduling restrictions, the codebook size may always be unnecessarily large.

Therefore, it is permissible to configure different total DAIs in each SF in the bundling window so as to cope with the situation where the radio base station changes its scheduling operation significantly in the middle in the bundling window. In this case, the user terminal can determine the HARQ-ACK codebook size based on the total DAI that is configured in the last subframe where a scheduling CC is present in the bundling window.

That is, when the user terminal receives different total DAIs in each SF in the bundling window, the user terminal determines that the total scheduled DAI of the SF is valid (e.g., DL signal was received). Also, if the user terminal receives different ARIs between SFs in the bundling window, as in the case where the total DAI is used, the user terminal can determine that the ARI of the SF that was last scheduled is valid.

FIG. 8 shows an example of a case where a total DAI different for each SF in the bundling window is configured. In the case shown in FIG. 8A, the radio base station first configures the total DAI to 8 bits and schedules SF #n1 and SF #n2. In this case, in the radio base station, the same total DAI (e.g., here, 8) is scheduled in the downlink control information of CC #0 to #2 and #4 scheduled in SF #n1 and in the downlink control information of CC #3 scheduled in SF #n1. The user terminal assumes that the codebook size at this point is 8 bits.

In FIG. 8B, the radio base station determines that more data should be allocated to the user terminal, and the radio base station increases the scheduling CCs in SF #n3 (e.g., here five CCs are scheduled). Since this will exceed the total configured DAI (e.g., codebook size), the radio base station will configure this by increasing the total DAI from 8 bits. For example, the radio base station transmits downlink control information of each CC including the increased total DAI based on CC #0 to #4 scheduled in SF #n3 (e.g., here, 10). The user terminal assumes that the codebook size in SF #n3 has been increased to 10 bits.

In FIG. 8C, the radio base station determines to allocate more data to the user terminal and configures scheduling CCs in SF #n4 (e.g., here, four CCs are scheduled). Since this exceeds the total DAI reconfigured with SF #n3 (e.g., here, 10), the radio base station increases the total DAI from 10 bits and configures it again. For example, the radio base station transmits downlink control information of each CC including the increased total DAI based on CC #1 to CC #4 scheduled in SF #n4 (e.g., here, 14). The user terminal assumes that the codebook size in SF #n4 has been increased to 14 bits.

By allowing the total DAI (e.g., codebook size) to be changed (i.e., updated) from the SF in the middle in the bundling window, even when the total DAI initially determined by the radio base station is not sufficient, the scheduling operation in the latter half SF can be flexibly performed. Furthermore, to avoid scheduling restrictions, always avoid configuring a large total DAI.

In one or more embodiments, the PUCCH format and PUCCH resource that the user terminal uses for A/N feedback are changed according to the codebook size. Accordingly, the user terminal may change the PUCCH format and/or the PUCCH resource according to the change of the codebook size (total DAI).

To be more specific, the user terminal can determine the PUCCH format to be used based on the codebook size (e.g., total DAI) in the last SF scheduled (e.g., SF #4 in FIG. 8C). Further, the user terminal can determine the PUCCH resource to be used based on the downlink control information (for example, ARI) received at the last scheduled SF (e.g., SF #4 in FIG. 8C). As a result, even if different total DAIs are configured for each SF in the bundling window, the user terminal can appropriately select the PUCCH format and/or PUCCH resource to be applied to the A/N feedback.

In one or more embodiments, an example of the configuration method of the content indicated by the bit value (bit information) of the bit field for the total DAI and the bit value of the bit field for the counter DAI will be described.

In the existing LTE system (e.g., Rel. 12 or earlier) TDD, UL DAI indicating the number of SFs scheduled in the bundling window is specified in UL grant with two bits. To be more specific, the total number of SFs scheduled by applying modulo operation using a predetermined value (for example, 4) is reported to the user terminal. Therefore, it may be possible to define the total DAI (e.g., codebook size) shown in one or more embodiments described above in two bits as well, and it may be possible to apply the modulo operation.

Figures 9A, 9B:
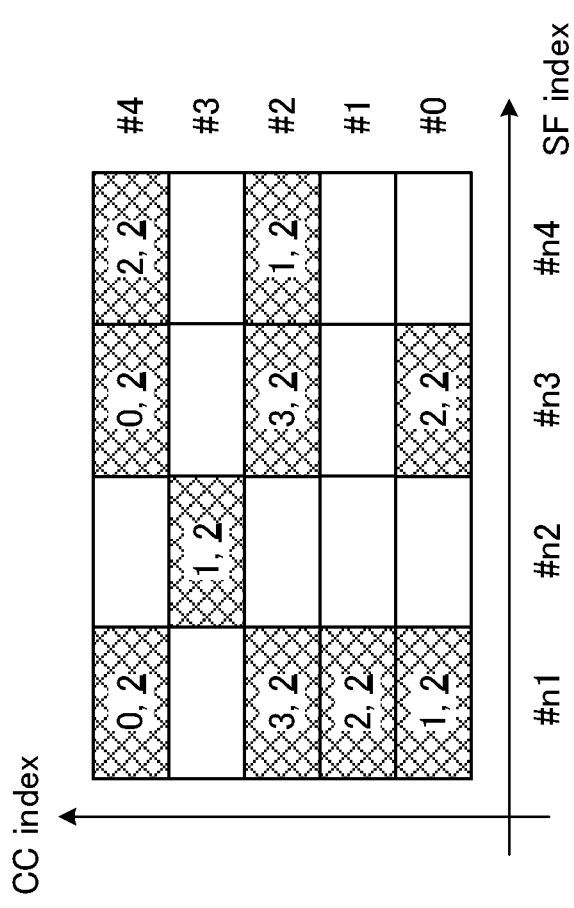
FIG. 9A and FIG. 9B are diagrams to show examples of cases where modulo operation is applied to the total DAI.

FIG. 9A shows a table associating bit values with 0 to 11 using modulo operation. In this case, 0, 4, and 8 are represented by the same bit value "00," 1, 5, and 9 are represented by the same bit value "01," 2, 6, and 10 are represented by the same bit value "10," and 3, 7, and 11 are represented by the same bit value "11."

As shown in FIG. 9A, when the radio base station reports a predetermined total DAI to the user terminal using the bit value using modulo operation, there is a risk that the user terminal may not be able to properly determine the total DAI. For example, suppose a case where a given codebook size (e.g., 2, 6, 10, 14 . . . ) is represented by a predetermined bit value (e.g., total DAI=2) (see FIG. 9B). In the case shown in FIG. 9B, the modulo operation is also applied to the counter DAI. In such a case, even if the user terminal detects the total DAI=2 included in the downlink control information, the user terminal cannot judge which of 2, 6, 10, 14 and so on the total DAI (e.g., codebook size) specifies.

Therefore, in order to allow the user terminal to properly identify the total DAI, it may be possible to configure the total DAI and the counter DAI in association with each other (e.g., the number of scheduled CCs (CWs)). For example, total DAI and counter DAIs may be associated with each other so that the total DAI is 2 when the counter DAI is 1 or 2, the total DAI is 6 when the counter DAI is 3 to 6, the total DAI is 10 when the counter DAI is 7 to 10, and the total DAI is 14 or larger when the counter DAI is 11 to 14. In this case, the user terminal can identify the codebook size indicated by the total DAI based on the counter DAI. In this case, unless the user terminal fails to detect DL signals of four CCs having consecutive count values at the same time, it is possible to correctly judge the accumulative values.

On the other hand, if total DAI and counter DAI are configured in association with each other, there is a possibility that the radio base station may not be able to flexibly perform the scheduling (the number of scheduled CCs (e.g., CWs)). For example, when the radio base station configures the total DAI (e.g., codebook size) to 10 bits (e.g., total DAI=2) the radio base station needs to configure the total number of scheduling CCs in the bundling window to 7 to 10 (e.g., counter DAI=7 to 10).

Therefore, from the viewpoint of securing the flexibility of scheduling in the radio base station, the total DAI is defined without using bit information that is obtained by applying modulo operation. For the counter DAI, the bit information obtained by the modulo operation may be applied. In this case, control may be performed so that the bit value of the total DAI increases in a manner different from the bit value of the counter DAI.

For example, as shown in FIG. 10, it is possible to configure the bit information of the total DAI in association with a predetermined bit value. In this case, as shown in FIG. 10A, different code points may be defined to increase by the same bit size, as shown in FIG. 10B, each bit information may be defined to increase by a predetermined bit value. In the case shown in FIG. 10, only two bits are used, but three bits or more may be used.

Further, a table (see FIG. 10) defining the codebook size may be predefined (or set) for the user terminal or quasi-static it may be configured in a way.

When the total DAI included in the received downlink control information indicates 64 bits, the user terminal determines that the codebook size is 64 bits. As described above, the user terminal can determine the value (e.g., A/N) of each HARQ-ACK bit in the codebook based on the reception result of the counter DAI and the DL signal. Also, the user terminal can decide the applicable PUCCH format based on the codebook size specified by the total DAI.

The codebook size reported by the total DAI may be defined in association with the number of PRBs used in a given PUCCH format (for example, PUCCH format 4). For example, as shown in FIG. 11, for the bit information of the total DAI, the codebook size may be defined for each PRB used as a PUCCH resource (e.g., here 1 PRB to 4 PRB). The user terminal can determine the codebook size based on the total DAI included in downlink control information and the number of PRBs used in the predetermined PUCCH format.

Further, in the above description, it is assumed that the codebook size is the HARQ-ACK codebook size, but one or more embodiments disclosed herein are not limited to this. The above embodiments can also be applied to the codebook size (e.g., UCI codebook size) of uplink control information (UCI). Incidentally, it is possible to include HARQ-ACK, scheduling request (SR), and periodic channel state information (P-CSI) as uplink control information.

(Radio Communication System)

Now, the structure of the radio communication system according to one or more embodiments disclosed herein will be described below. In this radio communication system, the radio communication methods of the above-described embodiments are employed. Note that the radio communication methods of the above-described embodiments may be applied individually or may be applied in combination.

Figure 12:
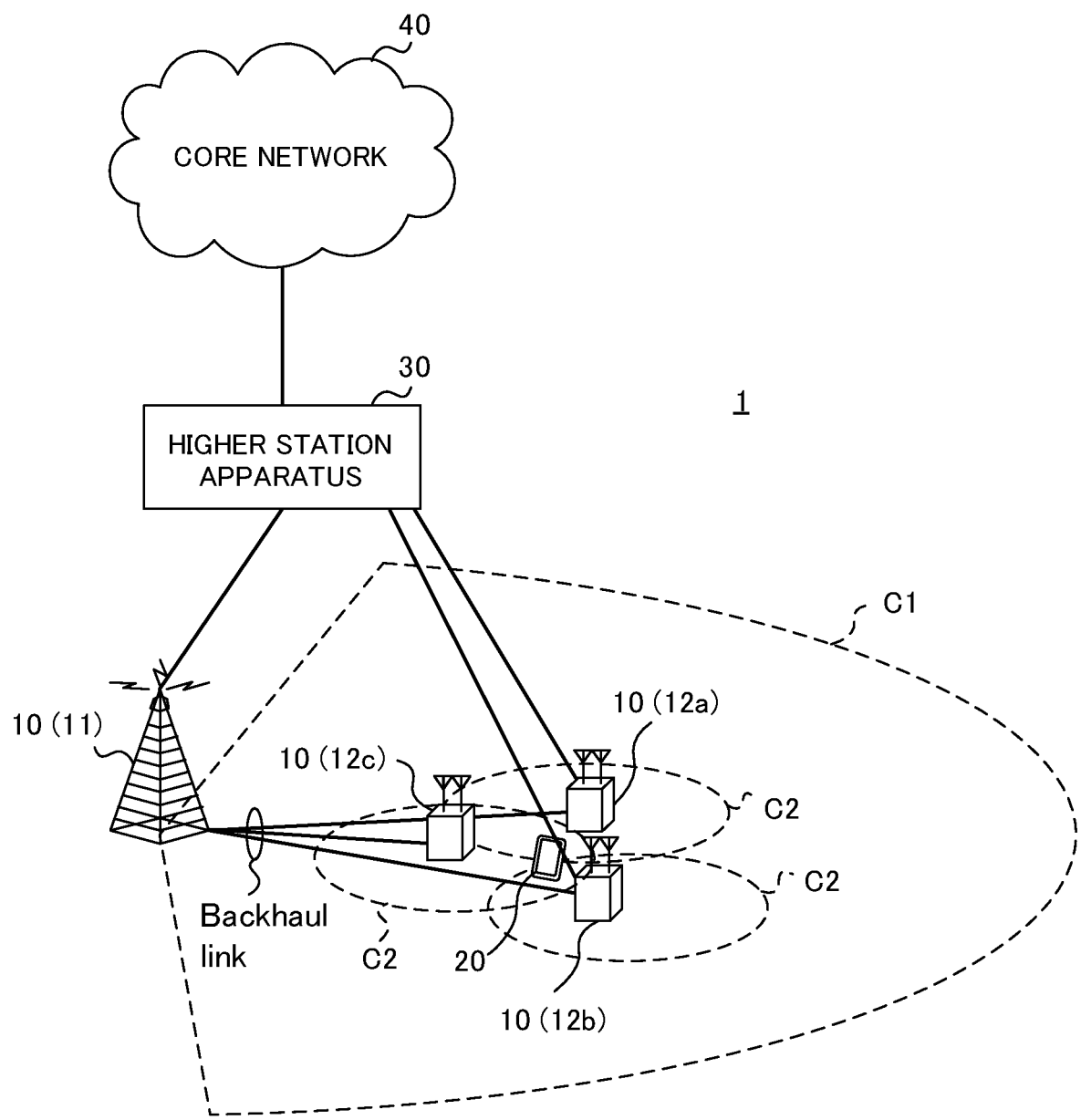
FIG. 12 is a diagram to show a schematic structure of a radio communication system according to one or more embodiments disclosed herein.

FIG. 12 is a diagram to show an example of a schematic structure of a radio communication system according to one or more embodiments. The radio communication system 1 can adopt carrier aggregation (CA) and/or dual connectivity (DC) to group a plurality of fundamental frequency blocks (e.g., component carriers) into one, where the LTE system bandwidth (for example, 20 MHz) constitutes one unit. Note that the radio communication system 1 may be referred to as "SUPER 3G," "LTE-Advanced (LTE-A)," "IMT-Advanced," "4G," "5G," "Future Radio Access (FRA)," and so on.

The radio communication system 1 shown in FIG. 12 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (e.g., CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with theCommon Public Radio (CPRI) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNodeB (eNB)," a "transmitting/receiving point" and so on. Also, the radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, Orthogonal Frequency Division Multiple Access (OFDMA) is applied to the downlink, and Single-Carrier Frequency Division Multiple Access (SC-FDMA) is applied to the uplink. OFDMA is a multi-carrier communication scheme to perform communication by dividing a frequency bandwidth into a plurality of narrow frequency bandwidths (e.g., subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined System Information Blocks (SIBs) are communicated in the PDSCH. Also, the Master Information Blocks (MIB) is communicated in the PBCH.

The downlink L1/L2 control channels include downlink control channels (the Physical Downlink Control CHannel (PDCCH) and/or the Enhanced Physical Downlink Control Channel (EPDCCH)), the Physical Control Format Indicator Channel (PCFICH), the Physical Hybrid-ARQ Indicator CHannel (PHICH) and so on. Downlink control information (DCI) including PDSCH and PUSCH scheduling information is communicated by the PDCCH. The number of OFDM symbols for use for the PDCCH is communicated by the PCFICH. HARQ delivery acknowledgement signals (ACKs/NACKs) in response to the PUSCH are communicated by the PHICH. The EPDCCH is frequency-division-multiplexed with the downlink shared data channel (PDSCH) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

<Radio Base Station>

Figure 13:
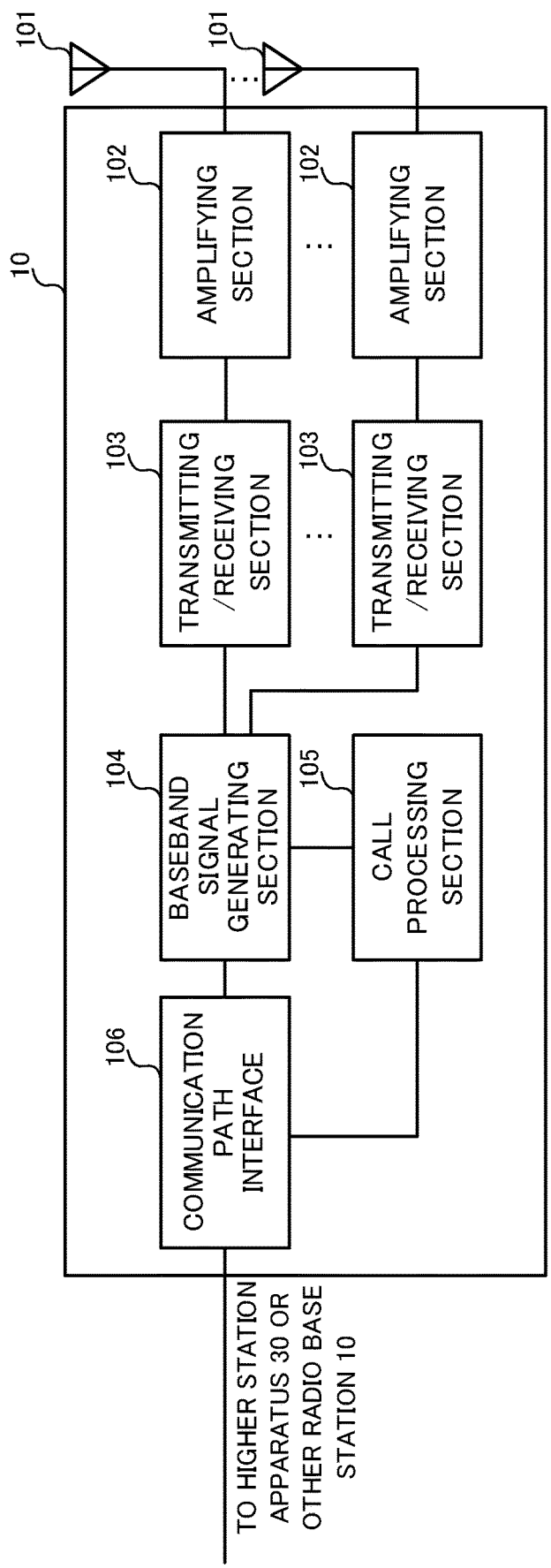
FIG. 13 is a diagram to show an example of an overall structure of a radio base station according to one or more embodiments disclosed herein.

FIG. 13 is a diagram to show an example of an overall structure of a radio base station according to one or more embodiments. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a Packet Data Convergence Protocol (PDCP) layer process, user data division and coupling, Radio Link Control (RLC) layer transmission processes such as RLC retransmission control, Medium Access Control (MAC) retransmission control (for example, an Hybrid Automatic Repeat reQuest) transmission process (HARQ), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections (e.g., transmitters) 103 can perform DL transmission from CCs to which TDD is applied, and can transmit, in downlink control information, first information indicating the codebook size and second information indicating the counter value indicating the accumulative number of DL assignment CCs in the bundling window. Further, the transmitting/receiving sections (e.g., receivers) 103 receive the HARQ-ACKs that the user terminal feeds back based on the bundling window defined in TDD in response to DL transmission. The transmitting/receiving sections 103 can be constituted by transmitters/receivers, transmitting/receiving circuits or transmitting/receiving devices that can be described based on common understanding of the technical field to which one or more embodiments herein pertain. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (e.g., backhaul signaling) with other radio base stations 10 via an inter-base station interface (for example, an interface in compliance with the Common Public Radio Interface (CPRI), such as optical fiber, the X2 interface, etc.).

Figure 14:
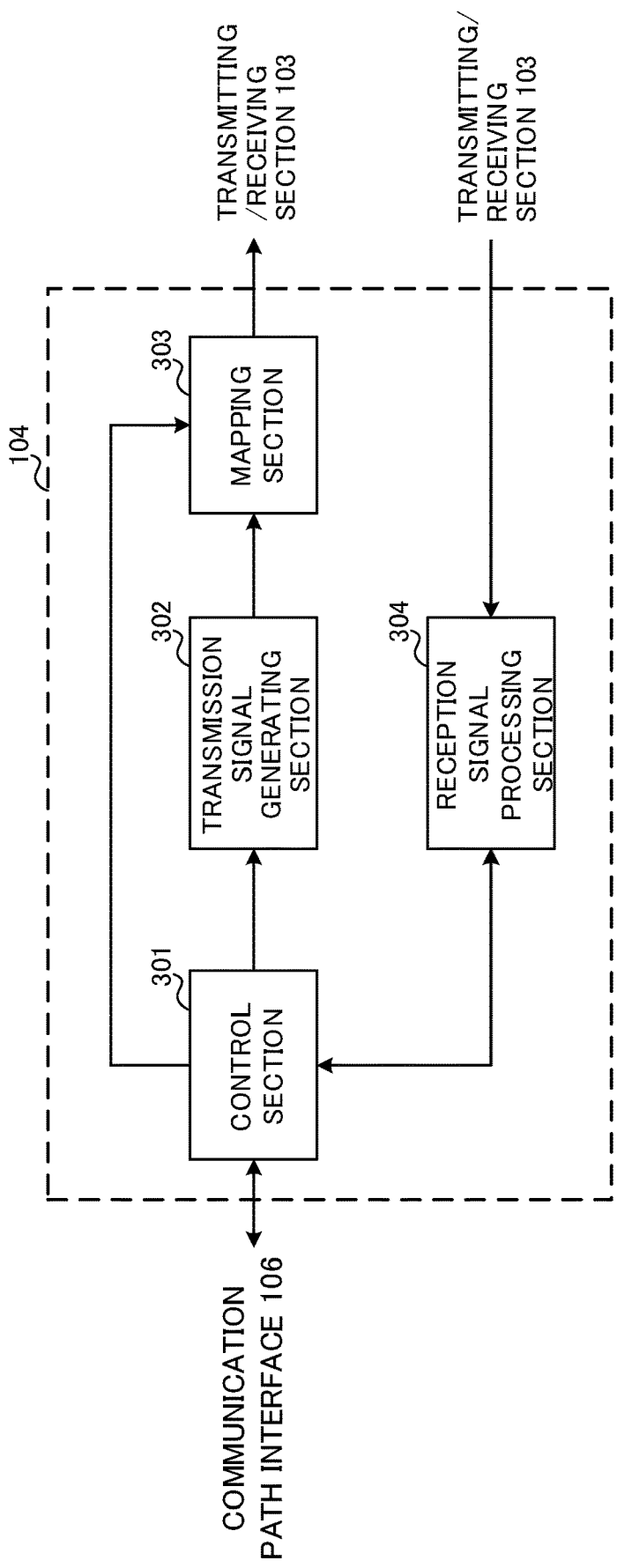
FIG. 14 is a diagram to show an example of a functional structure of a radio base station according to one or more embodiments disclosed herein.

FIG. 14 is a diagram to show an example of a functional structure of a radio base station according to the present embodiment. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 has a control section (e.g., processor) 301, a transmission signal generating section (e.g., processor) 302, a mapping section 303 and a received signal processing section 304.

The control section (e.g., processor) 301 controls the scheduling (for example, resource allocation) of downlink data signals that are transmitted in the PDSCH and downlink control signals that are communicated in the PDCCH and/or the EPDCCH. Also, the control section 301 controls the scheduling of system information, synchronization signals, paging information, Cell-specific Reference Signals (CRSs), Channel State Information Reference Signals (CSI-RSs) and so on. Furthermore, the control section 301 also controls the scheduling of uplink reference signals, uplink data signals that are transmitted in the PUSCH, and uplink control signals that are transmitted in the PUCCH and/or the PUSCH.

The control section 301 controls the retransmission of downlink data/new data transmission based on delivery acknowledgment signals (e.g., HARQ-ACKs) fed back from the user terminals. Further, the control section 301 controls reception processing of HARQ-ACK fed back from the user terminal based on the bundling window in response to DL transmission. Note that the reception processing may be performed in the received signal processing section 304 based on commands from the control section 301. Note that, for the control section 301, a controller, a control circuit or a control device that can be described based on common understanding of the technical field to one or more embodiments herein can be used.

The transmission signal generation section 302 generates DL signals (e.g., downlink control signals, downlink data signals, downlink reference signals and so on) based on commands from the control section 301, and outputs these signals to the mapping section 303. To be more specific, the transmission signal generation section 302 generates a downlink data signal (e.g., PDSCH) including user data, and outputs it to the mapping section 303. Further, the transmission signal generation section 302 generates a downlink control signal (e.g., PDCCH/EPDCCH) including DCI (e.g., UL grant), and outputs it to the mapping section 303. Further, the transmission signal generation section 302 generates downlink reference signals such as CRS and CSI-RS, and outputs them to the mapping section 303. For the transmission signal generation section 302, a signal generator, a signal generating circuit or a signal generating device that can be described based on common understanding of the technical field to which one or more embodiments disclosed herein can be used.

The mapping section 303 maps the downlink signals generated in the transmission signal generation section 302 to predetermined radio resources based on commands from the control section 301, and outputs these to the transmitting/receiving sections 103. For the mapping section 303, mapper, a mapping circuit or a mapping device that can be described based on common understanding of the technical field to which one or more embodiments disclosed herein can be used.

The received signal processing section 304 performs the reception process (for example, demapping, demodulation, decoding, etc.) of the UL signals (e.g., HARQ-ACK, PUSCH, etc.) transmitted from the user terminal 20. The processing results are output to the control section 301. The receiving process section 304 can be constituted by a signal processor, a signal processing circuit or a signal processing device, and a measurer, a measurement circuit or a measurement device that can be described based on common understanding of the technical field to which one or more embodiments disclosed herein pertain.

<User Terminal>

Figure 15:
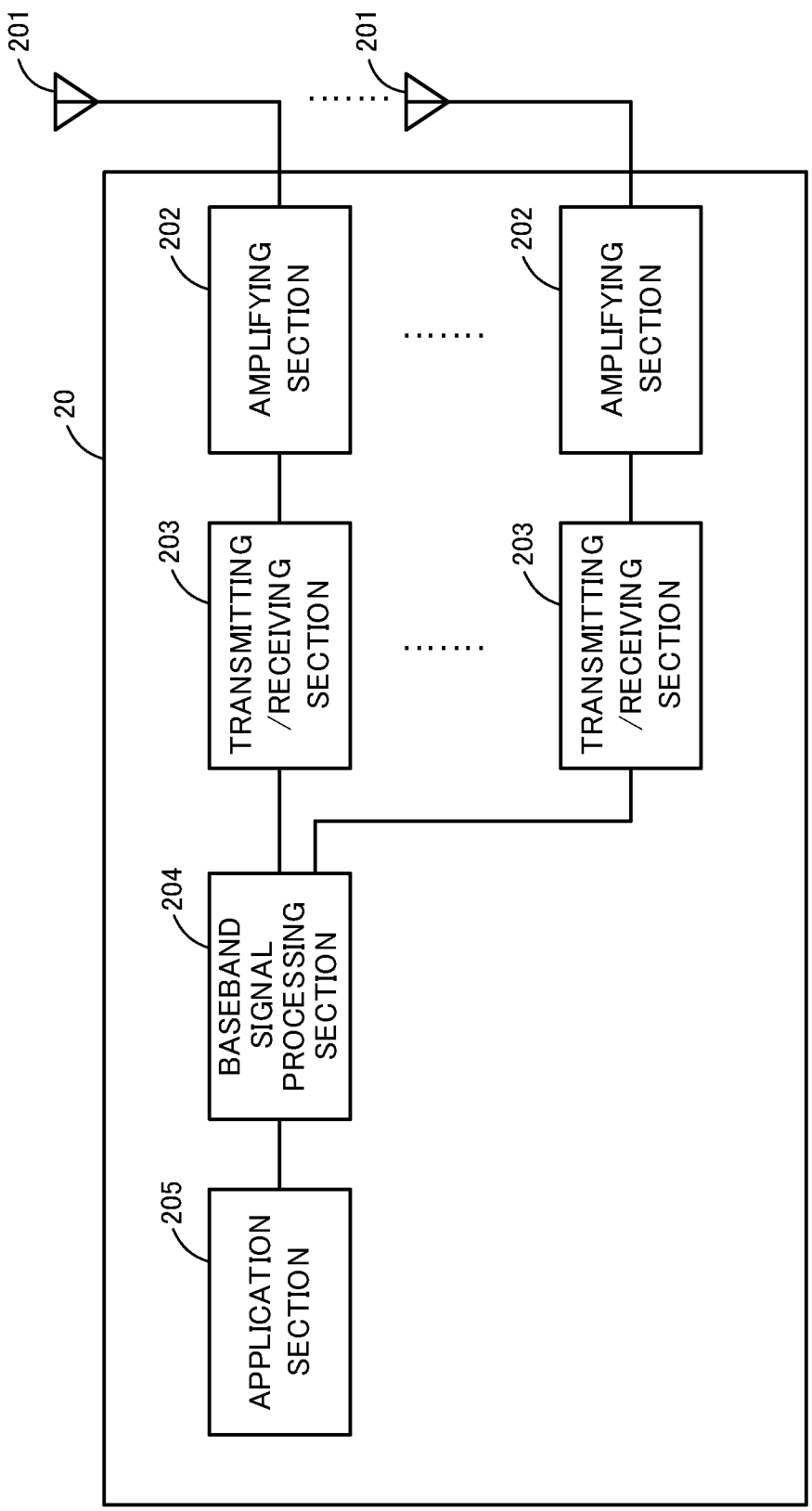
FIG. 15 is a diagram to show an example of an overall structure of a user terminal according to one or more embodiments disclosed herein.

FIG. 15 is a diagram to show an example of an overall structure of a user terminal according to one or more embodiments. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving section (e.g., receiver) 203 receives DL signals transmitted from a plurality of CCs including component carriers (CCs) using TDD. Further, the transmitting/receiving section (e.g., receiver) 203 receives first information indicating the codebook size and second information indicating the counter value indicating the accumulative number of DL assignment CCs in the bundling window, included in the downlink control information of the CCs for which DL transmission is performed. Note that, for the transmitting/receiving sections 203, transmitters/receivers, transmitting/receiving circuits or transmitting/receiving devices that can be described based on common understanding of the technical field to which one more embodiments disclosed herein can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 16:
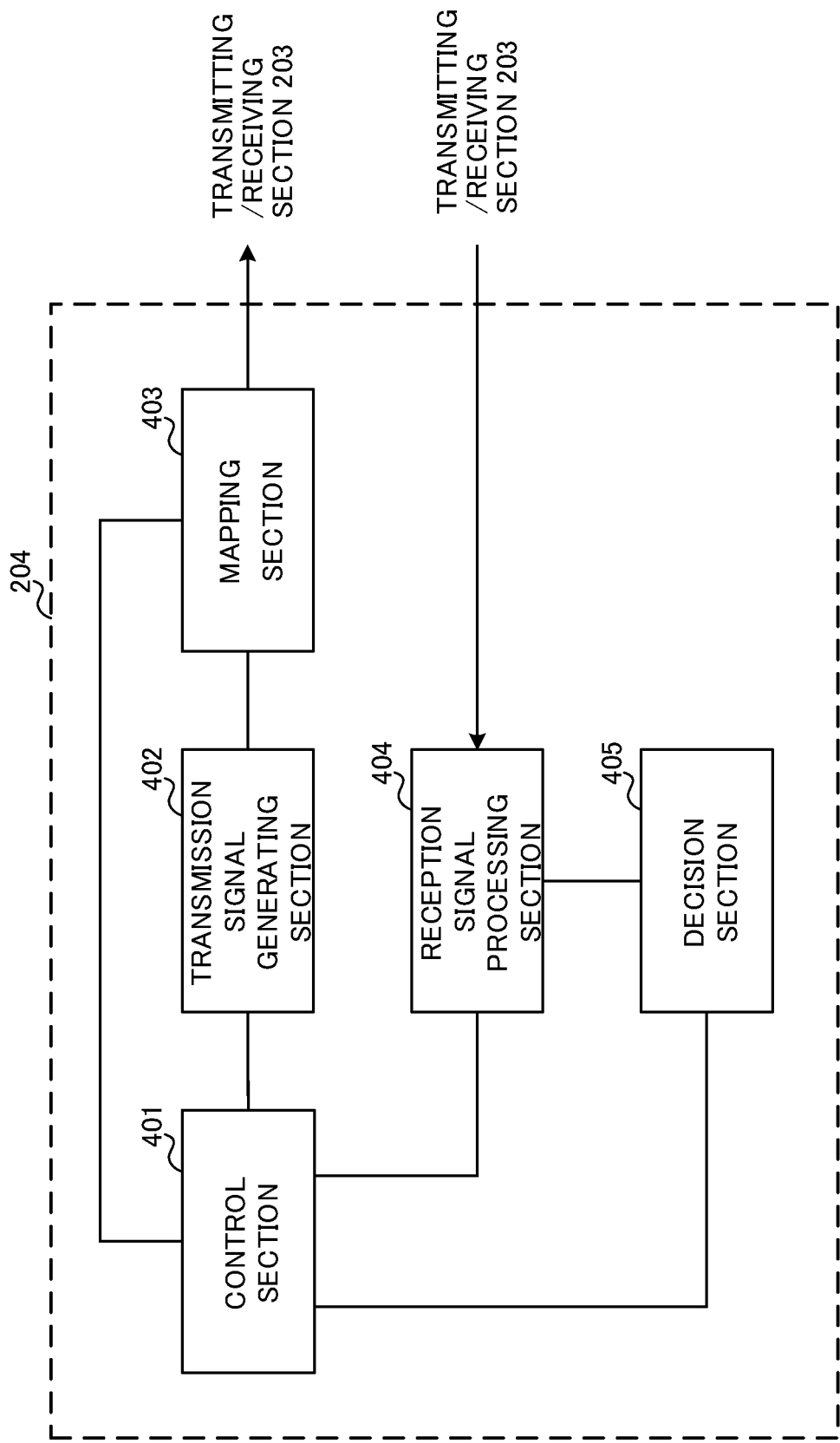
FIG. 16 is a diagram to show an example of a functional structure of a user terminal according to one or more embodiments disclosed herein.

FIG. 16 is a diagram to show an example of a functional structure of a user terminal according to the present embodiment. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 has a control section 401, a transmission signal generating section 402, a mapping section 403, a received signal processing section 404 and a decision section 405.

The control section 401 acquires the downlink control signals (e.g., signals transmitted in the PDCCH/EPDCCH) and downlink data signals (e.g., signals transmitted in the PDSCH) transmitted from the radio base station 10, from the received signal processing section 404. The control section 401 controls the generation of uplink control signals (for example, delivery acknowledgement signals (e.g., HARQ-ACKs) and so on) and uplink data signals based on the downlink control signals, the results of deciding whether or not re transmission control is necessary for the downlink data signals, and so on. To be more specific, the control section 401 can control the transmission signal generation section 402, the mapping section 403 and the received signal processing section 404.

The control section 401 controls the transmission of the HARQ-ACK based on first information indicating the codebook size (for example, total DAI) and second information (for example, counter DAI) indicating a counter value indicating the accumulative number of DL assignment CCs in the bundling window, included in the downlink control information of the CCs for which DL transmission is performed. The counter values are numbered based on the order of subframes and the order of CC indices in which DL transmission takes place, for CCs subject to DL transmission in the bundling window.

Further, the control section 401 can determine the HARQ-ACK to be configured at each bit position of the codebook whose size is determined based on the total DAI, based on counter DAIs. Further, in the codebook in which the HARQ-ACK of each CC is configured, the control section 401 can determine that the HARQ-ACK for a CC for which the counter DAI is not detected among the scheduled CCs is a NACK.

When multiple PUCCH formats are configured, the control section 401 can determine the applicable PUCCH format based on the total DAI. Further, based on the total DAI and/or ARI (e.g., Ack/Nack Resource Indicator) contained in the downlink control information of the CC of the last subframe in which the DL signal is received in the bundling window, the control section 401 can control the transmission of HARQ-ACK. Note that the total DAI can be information that explicitly indicates one bit value. For the control section 401, a controller, a control circuit or a control device that can be described based on common understanding of the technical field to which one more embodiments disclosed herein can be used.

The transmission signal generation section 402 generates UL signals based on commands from the control section 401, and outputs these signals to the mapping section 403. For example, the transmission signal generation section 402 generates uplink control signals such as delivery acknowledgement signals (e.g., HARQ-ACKs), channel state information (CSI) and so on, based on commands from the control section 401.

Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal. For the transmission signal generation section 402, a signal generator, a signal generating circuit or a signal generating device that can be described based on common understanding of the technical field to which the one or more embodiments disclosed herein can be used.

The mapping section 403 maps the uplink signals (e.g., uplink control signals and/or uplink data) generated in the transmission signal generation section 402 to radio resources based on commands from the control section 401, and output the result to the transmitting/receiving sections 203. For the mapping section 403, mapper, a mapping circuit or a mapping device that can be described based on common understanding of the technical field to which one or more embodiments disclosed herein can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401 and the decision section 405. The received signal processing section 404 outputs, for example, broadcast information, system information, RRC signaling, DCI and so on, to the control section 401.

The received signal processing section 404 can be constituted by a signal processor, a signal processing circuit or a signal processing device, and a measurer, a measurement circuit or a measurement device that can be described based on common understanding of the technical field to which the one or more embodiments disclosed herein pertain. Also, the received signal processing section 404 can constitute the receiving section according to one or more embodiments disclosed herein.

The decision section 405 makes retransmission control decisions (e.g., ACKs/NACKs) based on the decoding results in the receiving process section 404, and, furthermore, outputs the results to the control section 401. When downlink signals (e.g., PDSCH) are transmitted from multiple CCs (for example, six or more CCs), retransmission control decisions (e.g., ACKs/NACKs) are made on a per CC basis, and output to the control section 401. For the decision section 405, a decision maker, a decision making circuit or a decision making device that can be described based on common understanding of the technical field to which the one or more embodiments disclosed herein can be used.

(Hardware Structure)

Note that the block diagrams that have been used to describe the above embodiments show blocks in functional units. These functional blocks (e.g., components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and using these multiple devices.

Figure 17:
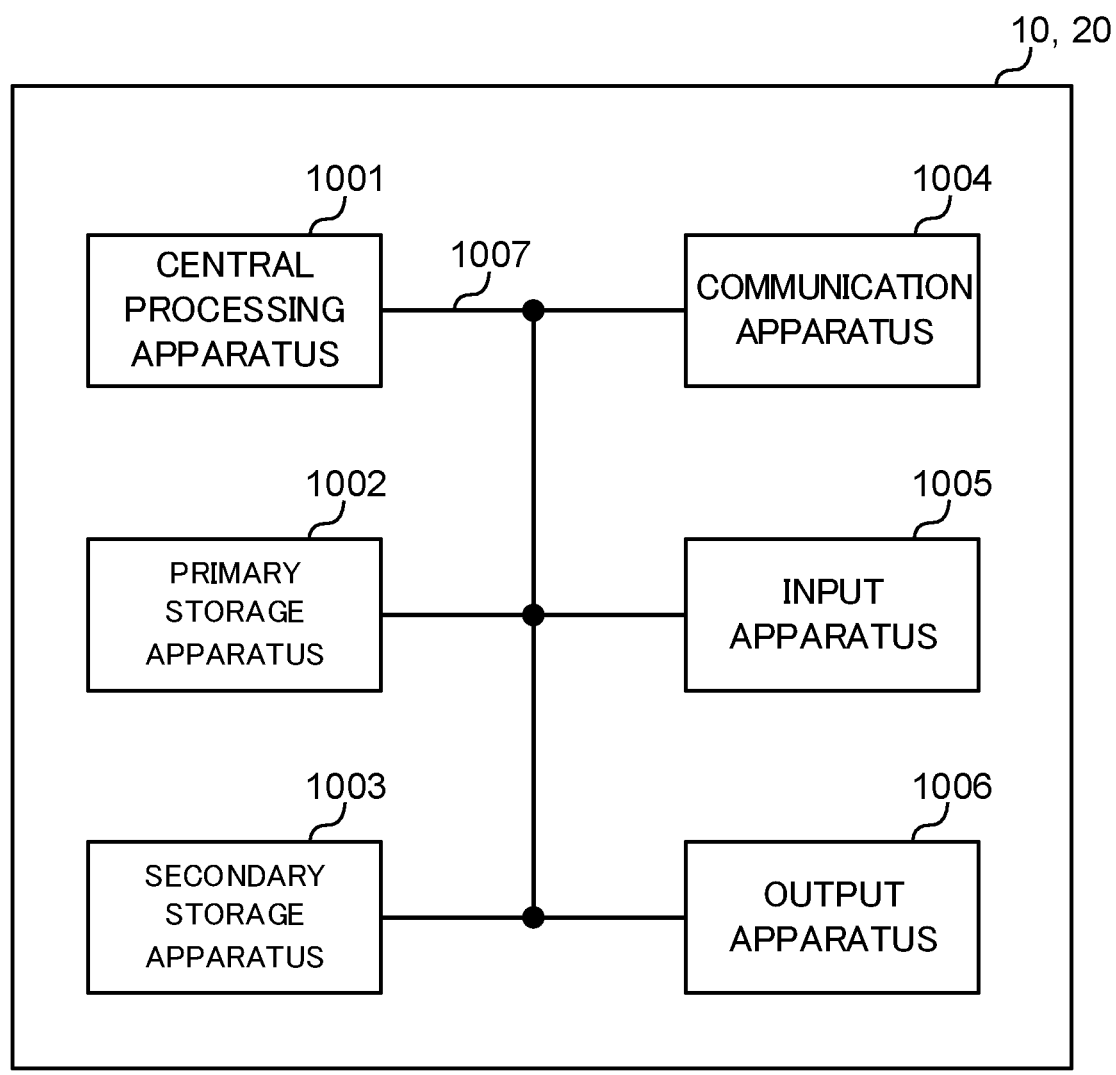
FIG. 17 is a diagram to show an example hardware structure of a radio base station and a user terminal according to one or more embodiments disclosed herein.

That is, a radio base station, a user terminal and so on according to one or more embodiments may function as a computer that executes the processes of the radio communication method of one or more embodiments disclosed herein. FIG. 17 is a diagram to show an example hardware structure of a radio base station and a user terminal according to one or more embodiments disclosed herein. Physically, a radio base station 10 and a user terminal 20, which have been described above, may be formed as a computer apparatus that includes a central processing apparatus (e.g., processor) 1001, a primary storage apparatus (e.g., memory) 1002, a secondary storage apparatus 1003, a communication apparatus 1004, an input apparatus 1005, an output apparatus 1006 and a bus 1007. Note that, in the following description, the word "apparatus" may be replaced by "circuit," "device," "unit" and so on.

Each function of the radio base station 10 and user terminal 20 is implemented by reading predetermined software (e.g., programs) on hardware such as the central processing apparatus 1001, the primary storage apparatus 1002 and so on, and controlling the calculations in the central processing apparatus 1001, the communication in the communication apparatus 1004, and the reading and/or writing of data in the primary storage apparatus 1002 and the secondary storage apparatus 1003.

The central processing apparatus 1001 may control the whole computer by, for example, running an operating system. The central processing apparatus 1001 may be formed with a processor (CPU: Central Processing Unit) that includes a control apparatus, a calculation apparatus, a register, interfaces with peripheral apparatus, and so on. For example, the above-described baseband signal process section 104 (204), call processing section 105 and so on may be implemented by the central processing apparatus 1001.

Also, the central processing apparatus 1001 reads programs, software modules, data and so on from the secondary storage apparatus 1003 and/or the communication apparatus 1004, into the primary storage apparatus 1002, and executes various processes in accordance with these. As for the programs, programs to allow the computer to execute at least part of the operations of the above-described embodiments may be used. For example, the control section 401 of the user terminal 20 may be stored in the primary storage apparatus 1002 and implemented by a control program that runs on the central processing apparatus 1001, and other functional blocks may be implemented likewise.

The primary storage apparatus (e.g., memory) 1002 is a computer-readable recording medium, and may be constituted by, for example, at least one of a Read Only Memory (ROM), an Erasable Programmable ROM (EPROM), a Random Access Memory (RAM) and so on. The secondary storage apparatus 1003 is a computer-readable recording medium, and may be constituted by, for example, at least one of a flexible disk, an opto-magnetic disk, a Compact Disc ROM (CD-ROM), a hard disk drive and so on.

The communication apparatus 1004 is hardware (e.g., transmitters/receivers) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Also, the apparatuses, including the central processing apparatus 1001, the primary storage apparatus 1002 and so on, may be connected via a bus 1007 to communicate information with each other. The bus 1007 may be formed with a single bus, or may be formed with buses that vary between the apparatuses. Note that the hardware structure of the radio base station 10 and the user terminal 20 may be designed to include one or more of each apparatus shown in the drawings, or may be designed not to include part of the apparatuses.

For example, the radio base station 10 and the user terminal 20 may be structured to include hardware such as an Application-Specific Integrated Circuit (ASIC), a Programmable Logic Device (PLD), an Field Programmable Gate Array (FPGA) and so on, and part or all of the functional blocks may be implemented by the hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (e.g., coaxial cables, optical fiber cables, twisted-pair cables, digital subscriber lines (DSL) and so on) and/or wireless technologies (e.g., infrared radiation and microwaves), these wired technologies and/or wireless technologies are also included in the definition of communication media.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, Downlink Control Information (DCI) and Uplink Control Information (UCI)), higher layer signaling (for example, Radio Resource Control (RRC) signaling, broadcast information (Master Information Blocks (MIBs) and System Information Blocks (SIBs)) and Medium Access Control (MAC) signaling and so on), other signals or combinations of these. Also, RRC signaling may be referred to as "RRC messages," and can be, for example, an RRC connection setup message, RRC connection reconfiguration message, and so on.

The examples/embodiments illustrated in this description may be applied to Long Term Evolution (LTE), LTE-Advanced (LTE-A), LTE-Beyond (LTE-Beyond), SUPER 3G, IMT-Advanced, 4th generation mobile communication system (4G), 5th generation mobile communication system (5G), Future Radio Access (FRA), New-Radio Access Technology (RAT), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A terminal comprising:
   a transmitter configured to transmit hybrid automatic repeat request acknowledgement signals (HARQ-ACKs) in response to downlink (DL) signals transmitted from a plurality of cells including cells using TDD;
   a receiver configured to receive first information, indicating a total number of cells to be subjected to DL transmission scheduling in a radio resource over a plurality of cells and a plurality of time domains, and second information, indicating an accumulative number of cells, in downlink control information; and
   a processor configured to perform control so that the HARQ-ACKs are transmitted based on the first information and the second information,
   wherein the first information is configured to a same value in the plurality of cells in a time domain of the radio resource, and the processor updates the first information on a per time domain basis of the radio resource,
   wherein the processor determines a number of bits of the HARQ-ACKs based on the first information included in the downlink control information in a last time domain of the radio resource in which a DL signal is received in the radio resource,
   wherein the processor determines HARQ-ACKs to be configured at each bit position in a codebook based on the second information, and
   wherein the size of the codebook is determined based on the first information.

2. The terminal according to claim 1, wherein, for cells that are subject to DL transmission scheduling in the radio resource, the second information is numbered based on an order of cell indices and an order of DL transmitted resource indices.

3. The terminal according to claim 1, wherein the processor is configured to select resources for allocating the HARQ-ACKs based on a transmit power control, TPC, field included in a downlink control information in a radio resource of a last time domain in which the DL signal is received in the radio resource.

4. The terminal according to claim 1, wherein, in the codebook in which HARQ-ACKs for each cell are configured, the processor is configured to determine that an HARQ-ACK for a cell where the second information is not detected, among the scheduled cells, is a negative acknowledgement (NACK).

5. The terminal according to claim 1, wherein the processor is configured to determine a physical uplink control channel (PUCCH) format to apply based on the first information.

6. A base station that communicates with a terminal that can use
a plurality of cells including cells using TDD, the radio base station comprising:
a transmitter configured to transmit first information, indicating a total number of cells to be subjected to DL transmission scheduling in a radio resource over a plurality of cells and a plurality of time domains, and second information, indicating an accumulative number of cells, in downlink control information; and
a receiver configured to receive HARQ-ACKs transmitted from the terminal based on the first information and the second information,
wherein the first information is configured to a same value within the plurality of cells in a time domain of the radio resource, and the first information is updated on a per resource range basis,
wherein a number of bits of the HARQ-ACKs are determined based on the first information included in the downlink control information in a last time domain of the radio resource in which a DL signal is transmitted in the radio resource,
wherein HARQ-ACKs to be configured at each bit position in a codebook are determined based on the second information, and
wherein the size of the codebook is determined based on the first information.

7. A radio communication method for a terminal that communicates with a radio base station, the radio communication method comprising:
transmitting HARQ-ACKs in response to DL signals transmitted from a plurality of cells including cells using TDD;
receiving first information, indicating a total number of cells to be subjected to DL transmission scheduling in a radio resource over a plurality of cells and a plurality of time domains, and second information, indicating an accumulative number of cells, in downlink control information; and
performing control so that the HARQ-ACKs are transmitted based on the first information and the second information,
wherein the first information is configured to a same value in the plurality of cells in a time domain of the radio resource, and the first information is updated on a per time domain basis of the radio resource,
wherein the terminal determines a number of bits of the HARQ-ACKs based on the first information included in the downlink control information in a last time domain of the radio resource in which a DL signal is received in the radio resource,
wherein the user terminal determines HARQ-ACKs to be configured at each bit position in a codebook based on the second information, and
wherein the size of the codebook is determined based on the first information.

8. The terminal according to claim 1, wherein the first information is configured in a bit field defining a total downlink assignment indication (DAI), and the second information is configured in a bit field defining a counter DAI.

9. The base station according to claim 6, wherein the first information is configured in a bit field defining a total downlink assignment indication (DAI), and the second information is configured in a bit field defining a counter DAI.

10. The radio communication method according to claim 7, wherein the first information is configured in a bit field defining a total downlink assignment indication (DAI), and the second information is configured in a bit field defining a counter DAI.

* * * * *